United States Patent [19]
Sweeney et al.

[11] Patent Number: 5,983,020
[45] Date of Patent: Nov. 9, 1999

[54] RULE-BASED ENGINE FOR TRANSFORMATION OF CLASS HIERARCHY OF AN OBJECT-ORIENTED PROGRAM

[75] Inventors: Peter F. Sweeney, Chestnut Ridge; Frank Tip, Mount Kisco, both of N.Y.

[73] Assignee: International Business Machines Corporation, Armonk, N.Y.

[21] Appl. No.: 08/942,519

[22] Filed: Oct. 2, 1997

[51] Int. Cl.$^6$ ........................................................... G06F 9/44
[52] U.S. Cl. .................... 395/705; 395/702; 395/709; 707/103; 707/100; 706/47; 706/59
[58] Field of Search ............................. 395/705, 702, 395/701, 709, 710, 683, 685; 707/103, 100; 706/47, 50, 53, 59

[56] References Cited

U.S. PATENT DOCUMENTS

| | | | |
|---|---|---|---|
| 5,161,216 | 11/1992 | Reps et al. ............................... | 395/704 |
| 5,414,854 | 5/1995 | Heninger et al. ........................ | 395/700 |
| 5,544,302 | 8/1996 | Nguyen .................................... | 395/161 |
| 5,720,009 | 2/1998 | Kirk et al. ................................ | 706/47 |
| 5,794,041 | 8/1998 | Law et al. ................................ | 395/701 |
| 5,854,119 | 12/1998 | Kozuka et al. .......................... | 395/702 |

OTHER PUBLICATIONS

Tip et al., "Slicing Class Hierarchies in C++," Proceedings of the 1996 ACM Conference on Object–Oriented Programming Systems, Languages, and Applications (OOPSLA'96), San Jose, CA., pp. 179–197, Oct. 1996.

Tip et al., "Class hierarchy specialization," Proceedings of the 11th Annual Conference on Object Orirented Programming Systems, Languages, and Applications (OOPSLA'97), Atlanta, GA., pp. 271–285, ACM SIGPLAN Notices 32(10), 1997.

Frank Tip, "A survey of program slicing techniques," Journal of Programming Languages 3, pp. 121–189, 1995.

Agesen et al., "Sifting out of gold: Delivering compact applications from an exploratory object–oriented programming environment," Proceedings of the 9th Annual Conference on Object–Oriented Programming Systems, Languages, and Applications (OOPSLA'94), Po, 1994.

Field et al., "Parametric Program Slicing," Papers of the 22nd ACM SIGPLAN–SIGACT symposium on Principles of programming languages, POPL'95, San Francisco, CA., pp. 379–392, Jan. 1995.

Chen et al., "Omega—an Integrated Environment for C++ Program Maintenance," Proceedings of International Conference on Software Maintenance 1996, IEEE, pp. 114–123, Nov. 1996.

Dean et al., "Optimization of Object–Oriented Programs Using Static Class Hierarchy Analysis," ECOOP'95, Aug. 1995.

Zhao et al., "Static Slicing of Concurrent Object–Oriented Programs," Proceedings of 20th International Computer Software and Applications Conference, COMPSAC'96, IEEE, pp. 312–320, Aug. 1996.

Holzle et al., "Optimizing Dynamically–Dispatched Calls with Run–Time Type Feedback," ACM SIGPLAN 94, Orlando, FL., pp. 326–336, Jun. 1994.

*Primary Examiner*—Tariq R. Hafiz
*Assistant Examiner*—Tuan Q. Dam
*Attorney, Agent, or Firm*—Jay P. Sbrollini

[57] ABSTRACT

A mechanism is provided that transforms a class hierarchy of an object-oriented program to a new class hierarchy based upon a set of rules. The new class hierarchy is constructed by transforming a class hierarchy based upon a set of transformation rules which perform one of the following operations: i) merging of two classes; ii) removing a virtual inheritance relation; and iii) replacing a virtual inheritance relation with a non-virtual inheritance relation. The transformation is preferably generated on either a specialized class hierarchy or a class hierarchy obtained by class hierarchy slicing. Thus, the new class hierarchy is a simplification of the inheritance structure, which may result in a reduction in the number of compiler-generated fields in objects, and hence in a reduction of object size of the program.

6 Claims, 28 Drawing Sheets

```
class S {
public:
  int y;
  virtual void foo();
  void bar();
};

class A {
public:
  int x;
};

class B : public A, virtual public S {
public:
  virtual void foo();
};

class C : public A, virtual public S {
public:
  void bar();
};

class D : public B, public C {
};
```

Figure 3: Example of a C++ class hierarchy.

Example fo the layout of an object of type D.

Subobject graph for type D.

```
     /* VisibleOccs finds all "visible occurrences" of a member m in a given subobject. */
[1]  function visible-occs(SubObjectGraph G, subobject n, member m): SubObjectSet;
[2]  begin
[3]      Let [C,D_1 ··· D_n] = n;
[4]      if (class D_n contains member m) then
         /* If the least derived class of n contains m */
         /* this is the only visible occurrence, because it hides all */
         /* other occurrences of m */
[5]          S = { n };
[6]      else
         /* Otherwise, D_n doesn't contain m itself. */
         /* Go "up" in the subobject graph to all "parent nodes" */
         /* of n, and look for m there */
[7]          S = ∅;
[8]          for each subobject n' that is immediately contained in n do
[9]              S := S ∪ visible-occs(G, n', m);
[10]         end for
[11]     end if
[12]     return S;
[13] end;

/* For a static lookup of a member m, static-lookup */
     /* determines in which subobject the selected m is located */
[14] function static-lookup(SubObjectGraph G, subobject n, member m): subobject;
[15] begin
[16]     S = visible-occs(G, n, m);
[17]     Let n' be the unique minimal subobject in S that contains all other subobjects in S;
[18]     return n';
[19] end;

/* For a cast to type C, typecast determines the */
     /* selected subobject with least derived class C */
[20] function typecast(SubObjectGraph G, subobject n, class C): subobject;
[21] begin
[22]     Let n' be the unique subobject that is contained in n and whose least derived class is C;
[23]     return n';
[24] end;

/* compose: composition of subobjects */
[25] function compose(SubObject n_1, SubObject n_2): SubObject;
[26]     Let [D,C_1 ··· C_n] = n;
[27]     Let [C_n,B_1 ··· B_n] = n';
[28]     if (C_n = B_1) then
[29]         return [D,C_1 ··· C_n · B_1 ··· B_n];
[30]     else
[31]         return [D,B_1 ··· B_n];
[32]     end if
[33] end;
```

Figure 6: Pseudo-code for Static Lookup and TypeCast operations.

Overview of class hierarchy specialization method.

```
[1]    procedure DetermineBasicInfo(Program P);
[2]    begin
[3]        call DetermineVariables(P);
[4]        call DeterminePointsToInfo(P);
[5]        call DetermineMembers(P);
[6]        call DetermineAssignments(P);
[7]        call DetermineMemberAccessOperations(P);
[8]    end;

/* procedure DetermineVariables collects all variables in the program whose type is */
       /* a class, and stores this information in variable classVars. Similarly, all variables */
       /* in the program whose type is a pointer to a class are stored in variable classPtrVars. */
[9]    procedure DetermineVariables(Program P);
[10]   begin
[11]       let classVars be the empty set;
[12]       let classPtrVars be the empty set;
[13]       for each variable v in P do
[14]           if (the type of v in P is a class C then
[15]               classVars := classVars ∪ { v };
[16]           elsif (the type of v in P is a pointer to a class C then
[17]               classPtrVars := classPtrVars ∪ { v };
[18]           end if
[19]       end for
[20]   end;

/* procedure DeterminePointsToInfo determines for each variable in classPtrVars, a */
       /* conservative approximation of the variables in classVars that it may point to. */
[21]   procedure DeterminePointsToInfo(Program P);
[22]   begin
[23]       let pointsTo be the empty set;
[24]       for each variable p in classPtrVars do
[25]           for each variable v in classVars do
[26]               if (p may point to v) then /* use existing algorithm for points-to/alias analysis to determine this */
[27]                   pointsTo := pointsTo ∪ { (p,v) };
[28]               end if
[29]           end for
[30]       end for
[31]   end;

/* procedure DetermineMembers collects all data members in the program, and stores them in dataMembers */
       /* Similarly, all non-virtual methods are stored in nonVirtualMethods, and all virtual methods */
       /* in virtualMethods. */
[32]   procedure DetermineMembers(Program P);
[33]   begin
[34]       let dataMembers be the empty set;
[35]       let nonVirtualMethods be the empty set;
[36]       let virtualMethods be the empty set;
[37]       for each member m in the class hierarchy of P do
[38]           if (m is a data member) then
[39]               dataMembers := dataMembers ∪ { m };
[40]           elsif (m is a nonvirtual method) then
[41]               nonVirtualMethods := nonVirtualMethods ∪ { m };
[42]           elsif (m is a virtual method) then
[43]               virtualMethods := virtualMethods ∪ { m };
[44]           end if
[45]       end for
[46]   end;
```

Figure 8: Pseudo-code for Step 701 of Figure 7 (Part 1).

```
/* Procedure DetermineAssignments iteratively collects all assignments that occur in a program */
/* and stores an abstract representation of these assignments in assignments. */
[1]   procedure DetermineAssignments(Program P);
[2]   begin
[3]       let assignments be the empty set;
[4]       for each assignment A in P do
[5]           if (A is of the form v = w, for some v, w in classVars) then
[6]               assignments := assignments ∪ { (v,w) };
[7]           elsif (A is of the form p = &w, for some p in classPtrVars, w in classVars) then
[8]               assignments := assignments ∪ { (*p,w) };
[9]           elsif (A is of the form p = q, for some p, q in classPtrVars) then
[10]              assignments := assignments ∪ { (*p,*q) };
[11]          elsif (A is of the form *p = w, for some p in classPtrVars, w in classVars) then
[12]              assignments := assignments ∪ { (*p,w) };
[13]          elsif (A is of the form v = *q, for some v in classVars, q in classPtrVars) then
[14]              assignments := assignments ∪ { (v,*q) };
[15]          elsif (A is of the form *p = *q, for some p, q in classPtrVars) then
[16]              assignments := assignments ∪ { (*p,*q) };
[17]          end if
[18]      end for
[19]  end;

/* Procedure DetermineMemberAccessOperations collects all member access operations that occur in */
/* the program, and stores an abstract representation of these operations in memberAccess */
[20]  procedure DetermineMemberAccessOperations(Program P);
[21]  begin
[22]      let memberAccess be the empty set;
[23]      for each operation v.m in P do
[24]          memberAccess := memberAccess ∪ { (m,v) };
[25]      end for
[26]      for each operation p->m in P do
[27]          memberAccess := memberAccess ∪ { (m,*p) };
[28]          if (m ∈ virtualMethods) then
[29]              for each (p,x) ∈ pointsTo do
[30]                  memberAccess := memberAccess ∪ { (m,x) };
[31]              end for
[32]          end if
[33]      end for
[34]  end;
```

Figure 9: Pseudo-code for Step 701 of Figure 7 (Part 2).

```
/* Procedure DetermineEquivalenceClasses partitions the variables in classVars and classPtrVars */
/* into equivalence classes, such that two variables in the same equivalence class must have exactly the */
/* same type in the specialized class hierarchy. */
[1]  procedure DetermineEquivalenceClasses(Program P);
[2]  begin /* Compute subobject graph G for program P */
[3]      let G be the subobject graph for program P;

/* Initially, each variable is in an equivalence class containing only itself */
[4]      for each variable v in (classVars ∪ classPtrVars) do
[5]          let the equivalence class |v| for variable v consist of { v };
[6]      end for /* If variables are indirectly assigned to each other, merge their equivalence classes */
[7]      for each pair of variables v, w in (classVars ∪ classPtrVars) do
[8]          if (assignments contains elements
                  $(v, x_1), (x_1, x_2), \cdots, (x_m, w)$ and
                  $(w, y_1), (y_1, y_2), \cdots, (y_n, v)$
                  for some $x_1, \cdots, x_n$ and $y_1, \cdots, y_m$ in (classVars ∪ classPtrVars)) then
[9]              merge equivalence classes |v| and |w|;
[10]         end if /* If two variables access a replicated class, merge their equivalence classes */
[11]         if assignments contains elements (x, v) and (x, w), for some x such that
                  the type of x occurs in ReplicatedClasses(P) then
[12]             merge equivalence classes |v| and |w|;
[13]         end if /* If two variables access a data member that occurs a replicated class, merge their equivalence classes */
     /* In addition, if two pointer variables access a virtual method in a replicated class, merge their equivalence classes */
[14]         if (memberAccess contains elements (m, v) and (m, w), for some m such that
                  (1) (m occurs in dataMembers) or (m occurs in virtualMethods and v and w occur in classPtrVars)
                  (2) there is a subobject n such that n = static-lookup(G, [V,V], m) and
                      n = static-lookup(G, [W,W], m) where V is the type of v, and W the type of w, and
                  (3) the least derived class of n occurs in ReplicatedClasses(P)) then
[15]             merge equivalence classes |v| and |w|;
[16]         end if /* If two variables access a member definition that occurs a replicated class, merge their equivalence classes */
[17]         if (memberAccess contains elements (m, v) and (m, w), for some m such that
                  (1) (m occurs in nonVirtualMethods) or (m occurs in virtualMethods and v and w occur in classVars)
                  (2) there is a subobject n such that n = static-lookup(G, [V,V], m) and
                      n = static-lookup(G, [W,W], m) where V is the type of v, and W the type of w, and
                  (3) the least derived class of n occurs in ReplicatedClasses(P)) then
[18]             merge equivalence classes |v| and |w|;
[19]         end if
[20]     end for
[21] end;

/* Determine the set of replicated classes, i.e., classes X for which there is a subobject n containing */
     /* two distinct subobjects with least derived class X */
[22] procedure ReplicatedClasses(program P): ClassSet;
[23] begin
[24]     let repClasses := ∅;
[25]     for each class X in the hierarchy of program P do
[26]         if there is a subobject n that contains two distinct subobjects with least derived class X then
[27]             let repClasses := repClasses ∪ { X };
[28]         end if
[29]     end for
[30]     return repClasses;
[31] end;
```

Figure 10: Pseudo-code for the sub-step of Step 701 in which classes of equivalent variables are determined.

```
class A {
  virtual int f(){ return g(); };
  virtual int g(){ return x; };
  int x;
};
class B : A {
  virtual int g(){ return y; };
  int y;
};
class C : B {
  virtual int f(){ return g() + z; };
  int z;
};

void main(){
  A a; B b; C c;
  A *ap;
  if (...)  { ap = &a; }
  else { if (...)  { ap = &b; }
         else { ap = &c; } }
  ap->f();
}
```

(a)

| | | |
|---|---|---|
| *classVars* | ≡ | { a, b, c } |
| *classPtrVars* | ≡ | { ap, A::f, A::g, B::g, C::f } |
| *dataMembers* | ≡ | { x, y, z } |
| *nonVirtualMethods* | ≡ | ∅    /* the empty set */ |
| *virtualMethods* | ≡ | { f, g } |
| *pointsTo* | ≡ | { ⟨ap, a⟩, ⟨ap, b⟩, ⟨ap, c⟩, ⟨A::f, a⟩, ⟨A::f, b⟩, ⟨C::f, c⟩, ⟨A::g, a⟩, ⟨B::g, b⟩, ⟨B::g, c⟩ } |
| *assignments* | ≡ | { ⟨*ap, a⟩, ⟨*ap, b⟩, ⟨*ap, c⟩, ⟨*A::f, a⟩, ⟨*A::f, b⟩, ⟨*C::f, c⟩, ⟨*A::g, a⟩, ⟨*B::g, b⟩, ⟨*B::g, c⟩ } |
| *memberAccess* | ≡ | { ⟨x, *A::g⟩, ⟨y, *B::g⟩, ⟨z, *C::f⟩, ⟨g, *A::f⟩, ⟨g, *C::f⟩, ⟨f, *ap⟩, ⟨f, a⟩, ⟨f, b⟩, ⟨f, c⟩, ⟨g, a⟩, ⟨g, b⟩, ⟨g, c⟩ } |

(b)

Figure 11:  (a) Example program. (b) Information gathered by procedure *DetermineBasicInfo* of Figure 8.

```
class A {
public:
  int x;
};

class B : public A {
public:
  virtual void foo();
};

class C : public A {
public:
  void bar();
};

class D : public B, public C {
};

void main(){
  D d;
  B *bp = &d;
  A *ap1 = bp;
  A *ap2 = bp;
  int j = ap1->x;
  int k = ap2->x;
  C *cp1 = &d;
  C *cp2 = &d;
  cp1 = cp2;
  cp2 = cp1;
}
```

(a)

{ d }
{ bp }
{ ap1, ap2 }
{ cp1, cp2 }

(b)

Figure 12: (a) Example class hierarchy and program. (b) Equivalence classes computed by procedure *DetermineEquivalenceClasses* of Figure 10.

```
[1]   procedure ComputeTypeConstraints(Program P);
[2]   begin

/* compute subobject graph G for program P */
[3]       let G be the subobject graph for program P;

[4]       call ComputeAssignmentTypeConstraints(P);
[5]       call ComputeMemberAccessTypeConstraints(P);
[6]       call ComputeDominanceTypeConstraints(P);
[7]   end;

[8]   function Elem(variable x): ConstraintElement;
[9]   begin
[10]      if (x = *X::f, for some method X::f()) then
[11]          return def(X::f);
[12]      else
[13]          return var(x);
[14]      end if
[15]  end;

[16]  procedure ComputeAssignmentTypeConstraints(P);
[17]  begin
[18]      let assignTC be the empty set;
[19]      for each pair (x,y) in assignments do
[20]          let X be the type of x in P;
[21]          let Y be the type of y in P;
[22]          n := typecast(G, [Y,Y], X);
[23]          let S be the set of all elements Elem(x') such that x' occurs in equivalence class |x|;
[24]          let T be the set of all elements Elem(y') such that y' occurs in equivalence class |y|;
[25]          assignTC := assignTC ∪ (S, n, T);
[26]      end for
[27]  end;

[28]  procedure ComputeMemberAccessTypeConstraints(P);
[29]  begin
[30]      let memberAccessTC be the empty set;
[31]      for each pair (m, y) in memberAccess do
[32]          let Y be the type of y in P;
[33]          n := static-lookup(G, [Y,Y], m);
[34]          X := ldc(n);
[35]          if ((y = *p, for some p in classPtrVars) or (m in dataMembers)) then
[36]              let S be the set { decl(X::m) };
[37]          else
[38]              let S be the set of all elements Elem(x') such that x' occurs in equivalence class |X::m|;
[39]          end if
[40]          let T be the set of all elements Elem(y') such that y' occurs in equivalence class |y|;
[41]          memberAccessTC := memberAccessTC ∪ (S, n, T);
[42]      end for
[43]  end;

[44]  procedure ComputeDominanceTypeConstraints(P);
[45]  begin
[46]      let dominanceTC be the empty set;
[47]      for each pair n', n of subobjects in the class hierarchy of P such that:
              (1) n' = n, or n' is contained in n,
              (2) A is the least derived class of n',
              (3) B is the least derived class of n, and
              (4) A and B both contain member m do
[48]          let S_decl be the set { decl(A::m) };
[49]          let T_decl be the set { decl(B::m) };
[50]          let S_def be the set of all elements Elem(x') such that x' occurs in equivalence class |A::m|;
[51]          let T_def be the set of all elements Elem(y') such that y' occurs in equivalence class |B::m|;
[52]          let n" be the subobject such that n' = compose(n, n");
[53]          dominanceTC := dominanceTC ∪ (S_decl, n", T_def);
[54]          if (A ≠ B) then
[55]              dominanceTC := dominanceTC ∪ (S_decl, n", T_decl);
[56]              dominanceTC := dominanceTC ∪ (S_def, n", T_def);
[57]          end if
[58]      end for
[59]  end;
```

Figure 13: Pseudo-code for Step 703 of Figure 7.

$$assignTC \equiv \{ \;\langle\{\; var(*ap)\; \}, [A,A], \{\; var(a)\; \}\rangle, \langle\{\; var(*ap)\; \}, [B,B\cdot A], \{\; var(b)\; \}\rangle,$$
$$\langle\{\; var(*ap)\; \}, [C,C\cdot B\cdot A], \{\; var(c)\; \}\rangle, \langle\{\; def(A::f)\; \}, [A,A], \{\; var(a)\; \}\rangle,$$
$$\langle\{\; def(A::f)\; \}, [B,B\cdot A], \{\; var(b)\; \}\rangle, \langle\{\; def(C::f)\; \}, [C,C], \{\; var(c)\; \}\rangle,$$
$$\langle\{\; def(A::g)\; \}, [A,A], \{\; var(a)\; \}\rangle, \langle\{\; def(B::g)\; \}, [B,B], \{\; var(b)\; \}\rangle,$$
$$\langle\{\; def(B::g)\; \}, [C,C\cdot B], \{\; var(c)\; \}\rangle \;\}$$

$$memberAccessTC \equiv \{ \;\langle\{\; decl(A::x)\; \}, [A,A], \{\; def(A::g)\; \}\rangle, \langle\{\; decl(B::y)\; \}, [B,B], \{\; def(B::g)\; \}\rangle,$$
$$\langle\{\; decl(C::z)\; \}, [C,C], \{\; def(C::f)\; \}\rangle, \langle\{\; decl(A::g)\; \}, [A,A], \{\; def(A::f)\; \}\rangle,$$
$$\langle\{\; decl(B::g)\; \}, [C,C\cdot B], \{\; def(C::f)\; \}\rangle, \langle\{\; decl(A::f)\; \}, [A,A], \{\; var(*ap)\; \}\rangle,$$
$$\langle\{\; def(A::f)\; \}, [A,A], \{\; var(a)\; \}\rangle, \langle\{\; def(A::f)\; \}, [B,B\cdot A], \{\; var(b)\; \}\rangle,$$
$$\langle\{\; def(C::f)\; \}, [C,C], \{\; var(c)\; \}\rangle, \langle\{\; def(A::g)\; \}, [A,A], \{\; var(a)\; \}\rangle,$$
$$\langle\{\; def(B::g)\; \}, [B,B], \{\; var(b)\; \}\rangle, \langle\{\; def(B::g)\; \}, [C,C\cdot B], \{\; var(c)\; \}\rangle \;\}$$

$$dominanceTC \equiv \{ \;\langle\{\; def(A::f)\; \}, [C,C\cdot B\cdot A], \{\; def(C::f)\; \}\rangle,$$
$$\langle\{\; def(A::g)\; \}, [B,B\cdot A], \{\; def(B::g)\; \}\rangle,$$
$$\langle\{\; decl(A::f)\; \}, [C,C\cdot B\cdot A], \{\; decl(C::f)\; \}\rangle,$$
$$\langle\{\; decl(A::g)\; \}, [B,B\cdot A], \{\; decl(B::g)\; \}\rangle,$$
$$\langle\{\; decl(A::f)\; \}, [A,A], \{\; def(A::f)\; \}\rangle,$$
$$\langle\{\; decl(A::f)\; \}, [C,C\cdot B\cdot A], \{\; def(C::f)\; \}\rangle,$$
$$\langle\{\; decl(A::g)\; \}, [A,A], \{\; def(A::g)\; \}\rangle,$$
$$\langle\{\; decl(A::g)\; \}, [B,B\cdot A], \{\; def(B::g)\; \}\rangle,$$
$$\langle\{\; decl(B::g)\; \}, [B,B], \{\; def(B::g)\; \}\rangle,$$
$$\langle\{\; decl(C::f)\; \}, [C,C], \{\; def(C::f)\; \}\rangle \;\}$$

Figure 14: Type constraints computed for the program of Figure 11(a) by procedure *ComputeTypeConstraints* of Figure 13.

```
[1]   function ConstructSpecializedSubObjectGraph(P): SubObjectGraph;
[2]   begin /* initialize nodes and edges of specialized subobject graph */
[3]      let G = (N, E) be a graph such that N is the empty set of nodes, and E the empty set of edges;

/* initialize worklist */
[4]      let workList = ∅;

/* add element to workList for each class-typed variable */
[5]      for each variable v in classVars do
[6]         let V be the type of v in program P;
[7]         let n be the subobject [V,V];
[8]         let S be the set of all elements Elem(v') such that v' occurs in equivalence class |v|;
[9]         workList := workList ∪ { T_{S,n,S} };
[10]     end for

[11]     while (workList is not empty) do
[12]        select a node x ≡ T_{T,n_1,U} from workList;
[13]        workList := workList - { x };  /* remove from workList */
[14]        N := N ∪ { x };  /* add to nodes of the graph */
[15]        for each constraint (S, n_2, T) in (assignTC ∪ memberAccessTC) do
[16]           x' := T_{S,compose(n_1,n_2),U};
[17]           if (x' does not occur in workList or N) then  /* if not already visited */
[18]              workList := workList ∪ { x' };  /* add to workList */
[19]           end if
[20]        end for
[21]     end while /* add edges of the specialized subobject graph */
[22]     for each pair of nodes x' ≡ T_{S,n',U}, x ≡ T_{T,n_1,U} in N such that there exists a
         type constraint (S, n_2, T) in (assignTC ∪ memberAccessTC ∪ dominanceTC), and
         n' ≡ compose(n_1,n_2) do
[23]        E := E ∪ { x' → x };
[24]     end for /* add members to nodes */
[25]     for each node x = T_{S,n,U} in N do
[26]        for each element decl(A::f) in S do
[27]           add the declaration of method A::f to node x;
[28]        end for
[29]        for each element def(A::f) in S do
[30]           add the definition of method A::f to node x;
[31]        end for
[32]     end for

[33]     return G;
[34]  end;

[35]  function ldc(Node T_{S,n,U}) : Class;
[36]  begin
[37]     return T_S;
[38]  end;

[39]  function mdc(Node T_{S,n,U}) : Class;
[40]  begin
[41]     return T_U;
[42]  end;
```

Figure 15: Pseudo-code for Step 705(a): Construction of the Specialized Subobject Graph.

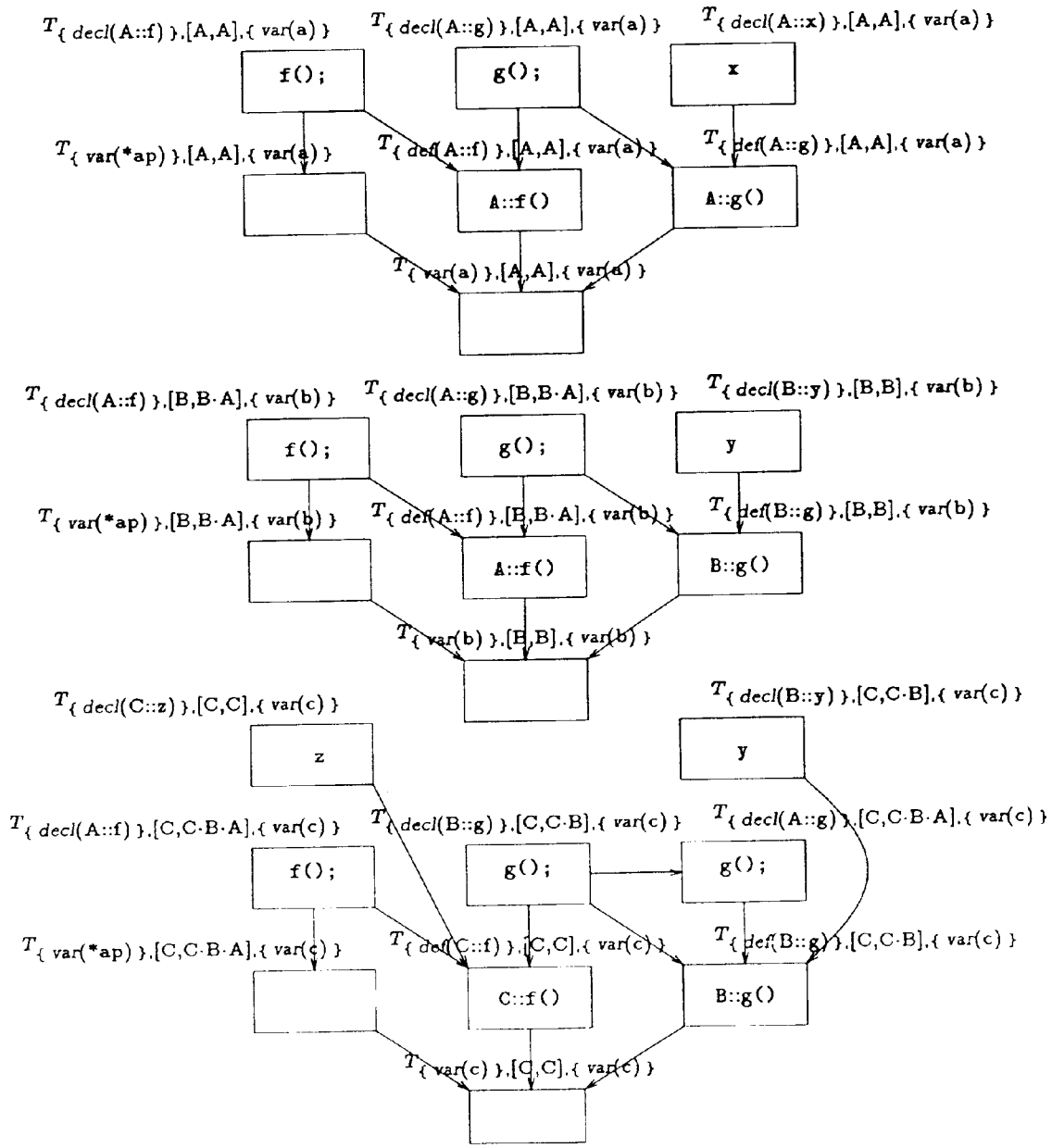
Figure 16: Specialized subobject graph for the example program of Figure 11.

Figure 17:
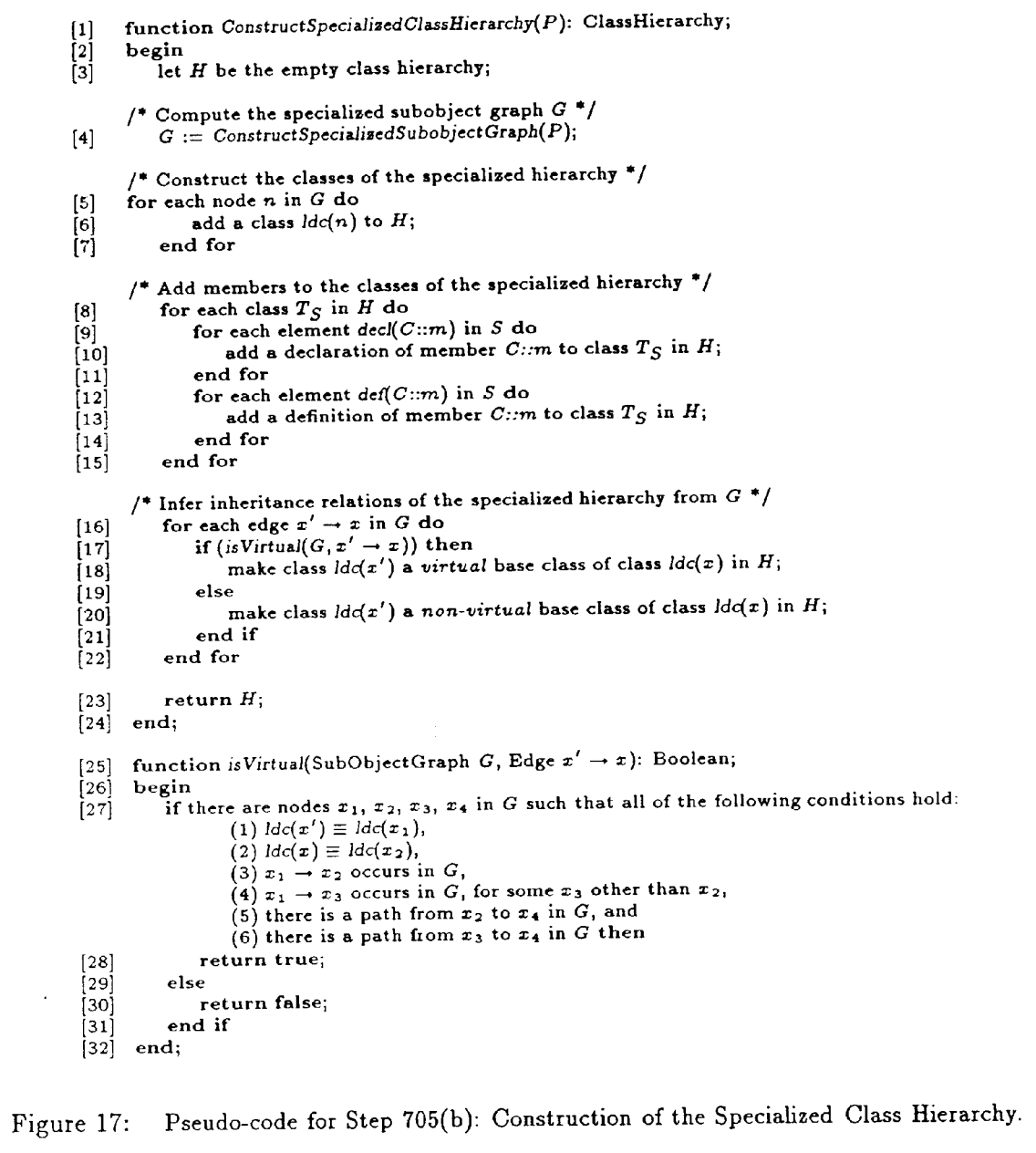

```
[1]   function ConstructSpecializedClassHierarchy(P): ClassHierarchy;
[2]   begin
[3]       let H be the empty class hierarchy;

/* Compute the specialized subobject graph G */
[4]       G := ConstructSpecializedSubobjectGraph(P);

/* Construct the classes of the specialized hierarchy */
[5]       for each node n in G do
[6]           add a class Idc(n) to H;
[7]       end for /* Add members to the classes of the specialized hierarchy */
[8]       for each class T_S in H do
[9]           for each element decl(C::m) in S do
[10]              add a declaration of member C::m to class T_S in H;
[11]          end for
[12]          for each element def(C::m) in S do
[13]              add a definition of member C::m to class T_S in H;
[14]          end for
[15]      end for /* Infer inheritance relations of the specialized hierarchy from G */
[16]      for each edge x' → x in G do
[17]          if (isVirtual(G, x' → x)) then
[18]              make class Idc(x') a virtual base class of class Idc(x) in H;
[19]          else
[20]              make class Idc(x') a non-virtual base class of class Idc(x) in H;
[21]          end if
[22]      end for

[23]      return H;
[24]  end;

[25]  function isVirtual(SubObjectGraph G, Edge x' → x): Boolean;
[26]  begin
[27]      if there are nodes x_1, x_2, x_3, x_4 in G such that all of the following conditions hold:
              (1) Idc(x') ≡ Idc(x_1),
              (2) Idc(x) ≡ Idc(x_2),
              (3) x_1 → x_2 occurs in G,
              (4) x_1 → x_3 occurs in G, for some x_3 other than x_2,
              (5) there is a path from x_2 to x_4 in G, and
              (6) there is a path from x_3 to x_4 in G then
[28]          return true;
[29]      else
[30]          return false;
[31]      end if
[32]  end;
```

Figure 17: Pseudo-code for Step 705(b): Construction of the Specialized Class Hierarchy.

```
[1]   procedure UpdateDeclarations(P);
[2]   begin
[3]       for each variable v in classVars do
[4]           let S be the equivalence class |v| for variable v;
[5]           replace the type of v in its declaration in P by T_S;
[6]       end for
[7]       for each variable p in classPtrVars do
[8]           let S be the equivalence class |p| for variable p;
[9]           replace the type of p in its declaration in P by *T_S;
[10]      end for
[11]  end;
```

Figure 18: Pseudo-code for Step 705(c): Updating the declarations in the program to reflect the new, specialized class hierarchy.

```
class T{ decl(A::x) } {                          class T{ def(B::g) }T{ decl(B::y) },
    int x;                                                       virtual T{ decl(A::g) },
};                                                               virtual T{ decl(B::g) } {
                                                     virtual int g(){ return y; };
class T{ decl(A::f) } {                          };
    virtual int f();
};                                               class T{ def(C::f) }T{ decl(C::z) },
                                                                 virtual T{ decl(A::f) },
class T{ decl(A::g) } {                                          virtual T{ decl(B::g) } {
    virtual int g();                                 virtual int f(){ return g() + z; };
};                                               };

class T{ decl(B::y) } {                          class T{ var(*ap) } :  virtual T{ decl(A::f) } { };
    int y;
};                                               class T{ var(a) } :  T{ def(A::f) }, T{ def(A::g) }, T{ var(*ap) } { };

class T{ decl(B::g) } :  virtual T{ decl(A::g) } {   class T{ var(b) } :  T{ def(A::f) }, T{ def(B::g) }, T{ var(*ap) } { };
    virtual int g();
};                                               class T{ var(c) } :  T{ def(C::f) }, T{ def(B::g) }, T{ var(*ap) } { };

class T{ decl(C::z) } {                          void main(){
    int z;                                           T{ var(a) } a; T{ var(b) } b; T{ var(c) } c;
};                                                   T{ var(*ap) } *ap;
                                                     if (...)  { ap = &a; }
class T{ def(A::g) } :  T{ decl(A::x) }, virtual T{ decl(A::g) } {   else if (...) { ap = &b; }
    virtual int g(){ return x; };                    else { ap = &c; }
};                                                   ap->f();
                                                 }
class T{ def(A::f) }virtual T{ decl(A::g) },
                    virtual T{ decl(A::f) } {
    virtual int f(){ return g(); };
};
```

Figure 19: Specialized Class Hierarchy resulting from Step 705(b) and updated program resulting from Step 705(c).

Rule 1: Merge a base class $X$ with a derived class $Y$ if:

1. $X$ and $Y$ have no members in common, except for the fact that for any member $m$, $X$ may contain a declaration of $m$, and $Y$ a definition of $m$.

2. There is no class $Z$ which is a direct nonvirtual base class of both $X$ and $Y$.

3. If there is a direct base class $X' \neq X$ of $Y$, and a direct derived class $Y' \neq Y$ of $X$, then $X'$ is an indirect base class of $Y'$.

4. If there are any variables in the program whose type is $X$, or any type $Y' \neq Y$ directly or indirectly derived from $X$, then neither $Y$ nor any direct or indirect base class $X' \neq X$ of $Y$ contains any data members.

5. If there are any variables in the program whose type is $X$, or any type $Y' \neq Y$ directly or indirectly derived from $X$, and if $Y$ or any direct or indirect base class $X' \neq X$ of $Y$ contains a declaration/definition of a virtual method, then $X$ contains a declaration/definition of a virtual method.

Rule 2: Remove the virtual inheritance relation between classes $X$ and $Z$ when:

1. $X$ is an immediate virtual base class of $Y$,

2. $X$ is an immediate virtual base class of $Z$,

3. $Y$ is a (direct or indirect) base class of $Z$.

Rule 3: Replace virtual inheritance between classes $X$ and $Y$ by nonvirtual inheritance when:

1. $X$ is an immediate virtual base class of $Y$, and 2. there is no class $Y' \neq Y$ such that (i) $X$ is an immediate virtual base class of $Y'$, and (ii) there is a class $Z$ that directly or indirectly inherits from both $Y$ and $Y'$.

Figure 20: Transformation rules for the simplification of class hierarchies.

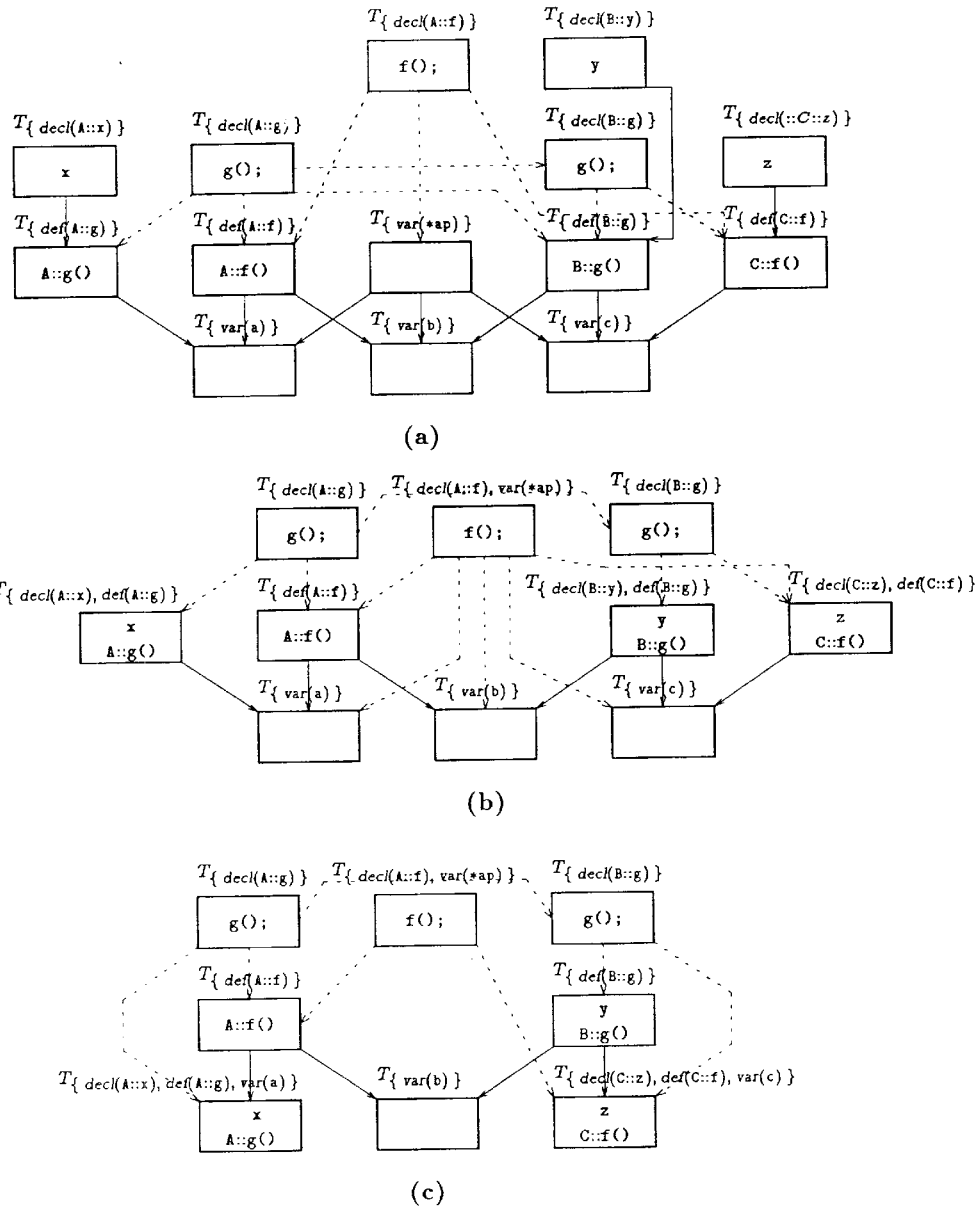

Figure 21: Illustration of the class hierarchies that result from applying the simplification rules of Section 5.4 to the specialized class hierarchy of Figure 19. In the figure, boxes indicate classes, solid arrows indicate nonvirtual (replicated) inheritance, and dashed arrows indicate virtual (shared) inheritance. An unqualified member name inside a box (e.g., f();) indicates that a declaration of that member occurs in the class. A qualified member name (e.g., A::g()) indicates a member definition and the class in the original hierarchy from where it originated (A).

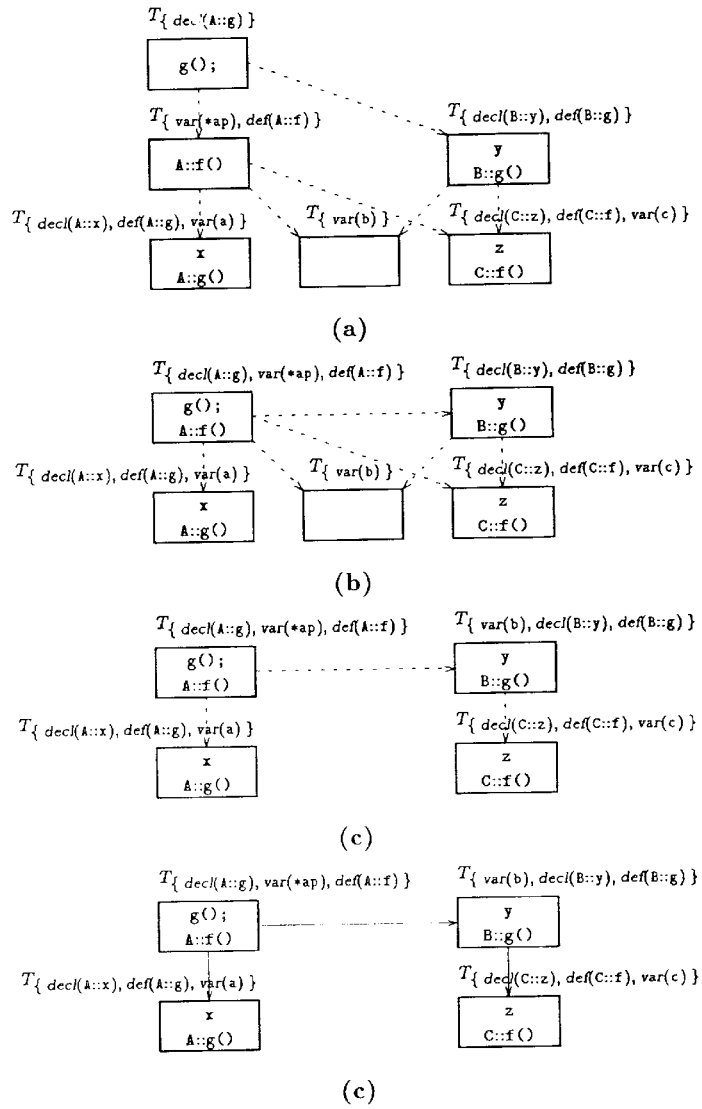
Figure 22: Illustration of the class hierarchies that result from applying the simplification rules of Section 5.4 to the specialized class hierarchy of Figure 19 (continuation of Figure 21).

```
class AInt {
public:
  virtual int f();
  int x;
};

class BInt : public virtual AInt {
public:
  virtual int f();
  int y;
};

class AImpl : public virtual AInt {
public:
  virtual int f(){ return x + g(); };
  virtual int g(){ return v; };
  int v;
};

class BImpl : public BInt, public AImpl {
public:
  virtual int f(){ return x + y + w + g(); };
  int w;
};

void main(){
  AImpl a;
  a.x = 10; a.v = 20;
  AInt *ap = &a;
  int p = ap->f();
  BImpl b;
  b.x = 30; b.y = 40; b.v = 50; b.w = 60;
  BInt *bp = &b;
  int q = bp->f();
}
```

Figure 23: Example of a C++ class hierarchy that exhibits virtual inheritance.

$$
\begin{aligned}
classVars &\equiv \{\,a,\,b\,\} \\
classPtrVars &\equiv \{\,ap,\,bp, \\
&\qquad AImpl{::}f, \\
&\qquad AImpl{::}g, \\
&\qquad BImpl{::}f\,\} \\
dataMembers &\equiv \{\,x,\,y,\,v,\,w\,\} \\
nonVirtualMethods &\equiv \emptyset \quad /\!*\,the\ empty\ set\,*\!/ \\
virtualMethods &\equiv \{\,f,\,g\,\} \\
pointsTo &\equiv \{\,\langle ap,a\rangle,\,\langle bp,b\rangle, \\
&\qquad \langle AImpl{::}f, a\rangle, \\
&\qquad \langle AImpl{::}g, a\rangle, \\
&\qquad \langle AImpl{::}g, b\rangle, \\
&\qquad \langle BImpl{::}f, b\rangle\,\} \\
assignments &\equiv \{\,\langle *ap, a\rangle,\,\langle *bp, b\rangle, \\
&\qquad \langle *AImpl{::}f, a\rangle, \\
&\qquad \langle *AImpl{::}g, a\rangle, \\
&\qquad \langle *BImpl{::}f, b\rangle, \\
&\qquad \langle *AImpl{::}g, b\rangle\,\} \\
memberAccess &\equiv \{\,\langle x,a\rangle,\,\langle x,b\rangle,\,\langle x, *AImpl{::}f\rangle,\,\langle x, *BImpl{::}f\rangle, \\
&\qquad \langle y,b\rangle,\,\langle y, *BImpl{::}f\rangle, \\
&\qquad \langle v,a\rangle,\,\langle v,b\rangle,\,\langle v, *AImpl{::}g\rangle, \\
&\qquad \langle w,b\rangle,\,\langle w, *BImpl{::}f\rangle, \\
&\qquad \langle f, *ap\rangle,\,\langle f, *bp\rangle,\,\langle f, a\rangle,\,\langle f, b\rangle, \\
&\qquad \langle g, *AImpl{::}f\rangle,\,\langle g, *BImpl{::}f\rangle,\,\langle g, a\rangle,\,\langle g, b\rangle\,\}
\end{aligned}
$$

Figure 24: Basic program information gathered for the program of Figure 23.

$assignTC$ ≡ { 〈{ var(*ap) }, [AImpl,AInt], { var(a) }〉,
〈{ var(*bp) }, [BImpl,BInt], { var(b) }〉,
〈{ def(*AImpl::f) }, [AImpl,AImpl], { var(a) }〉,
〈{ def(*AImpl::g) }, [AImpl,AImpl], { var(a) }〉,
〈{ def(*BImpl::f) }, [BImpl,BImpl], { var(b) }〉,
〈{ def(*AImpl::g) }, [BImpl,BImpl·AImpl], { var(b) }〉 }

$memberAccessTC$ ≡ { 〈{ decl(AInt::x) }, [AImpl,AInt], { var(a) }〉,
〈{ decl(AInt::x) }, [BImpl,AInt], { var(b) }〉,
〈{ decl(AInt::x) }, [AImpl,AInt], { def(*AImpl::f) }〉,
〈{ decl(AInt::x) }, [BImpl,AInt], { def(*BImpl::f) }〉,
〈{ decl(BInt::y) }, [BImpl,BImpl·BInt], { var(b) }〉,
〈{ decl(BInt::y) }, [BImpl,BImpl·BInt], { def(*BImpl::f) }〉,
〈{ decl(AImpl::v) }, [AImpl,AImpl], { var(a) }〉,
〈{ decl(AImpl::v) }, [BImpl,BImpl·AImpl], { var(b) }〉,
〈{ decl(AImpl::v) }, [AImpl,AImpl], { def(*AImpl::g) }〉,
〈{ decl(w) }, [BImpl,BImpl], { var(b) }〉,
〈{ decl(w) }, [BImpl,BImpl], { def(*BImpl::f) }〉,
〈{ decl(AInt::f) }, [AInt,AInt], { var(*ap) }〉,
〈{ decl(BInt::f) }, [BInt,BInt], { var(*bp) }〉,
〈{ def(AImpl::f) }, [AImpl,AImpl], { var(a) }〉,
〈{ def(BImpl::f) }, [BImpl,BImpl], { var(b) }〉,
〈{ decl(AImpl::g) }, [AImpl,AImpl], { def(*AImpl::f) }〉,
〈{ decl(AImpl::g) }, [BImpl,BImpl·AImpl], { def(*BImpl::f) }〉,
〈{ def(AImpl::g) }, [AImpl,AImpl], { var(a) }〉,
〈{ def(AImpl::g) }, [BImpl,BImpl·AImpl], { var(b) }〉 }

$dominanceTC$ ≡ { 〈{ decl(AInt::f) }, [AImpl,AInt], { decl(AImpl::f) }〉
〈{ decl(AInt::f) }, [AImpl,AInt], { def(AImpl::f) }〉
〈{ decl(AInt::f) }, [BInt,AInt], { decl(BInt::f) }〉
〈{ decl(AInt::f) }, [BImpl,AInt], { decl(BImpl::f) }〉
〈{ decl(AInt::f) }, [BImpl,AInt], { def(BImpl::f) }〉
〈{ decl(AImpl::f) }, [AImpl,AImpl], { def(AImpl::f) }〉
〈{ decl(AImpl::f) }, [BImpl,BImpl·AImpl], { decl(BImpl::f) }〉
〈{ decl(AImpl::f) }, [BImpl,BImpl·AImpl], { def(BImpl::f) }〉
〈{ def(AImpl::f) }, [BImpl,BImpl·AImpl], { decl(BImpl::f) }〉
〈{ def(AImpl::f) }, [BImpl,BImpl·AImpl], { def(BImpl::f) }〉
〈{ decl(BInt::f) }, [BImpl,BImpl·BInt], { decl(BImpl::f) }〉
〈{ decl(BInt::f) }, [BImpl,BImpl·BInt], { def(BImpl::f) }〉
〈{ decl(BImpl::f) }, [BImpl,BImpl], { def(BImpl::f) }〉 }

Figure 25: Type constraints computed for the program of Figure 23 using the information of Figure 24.

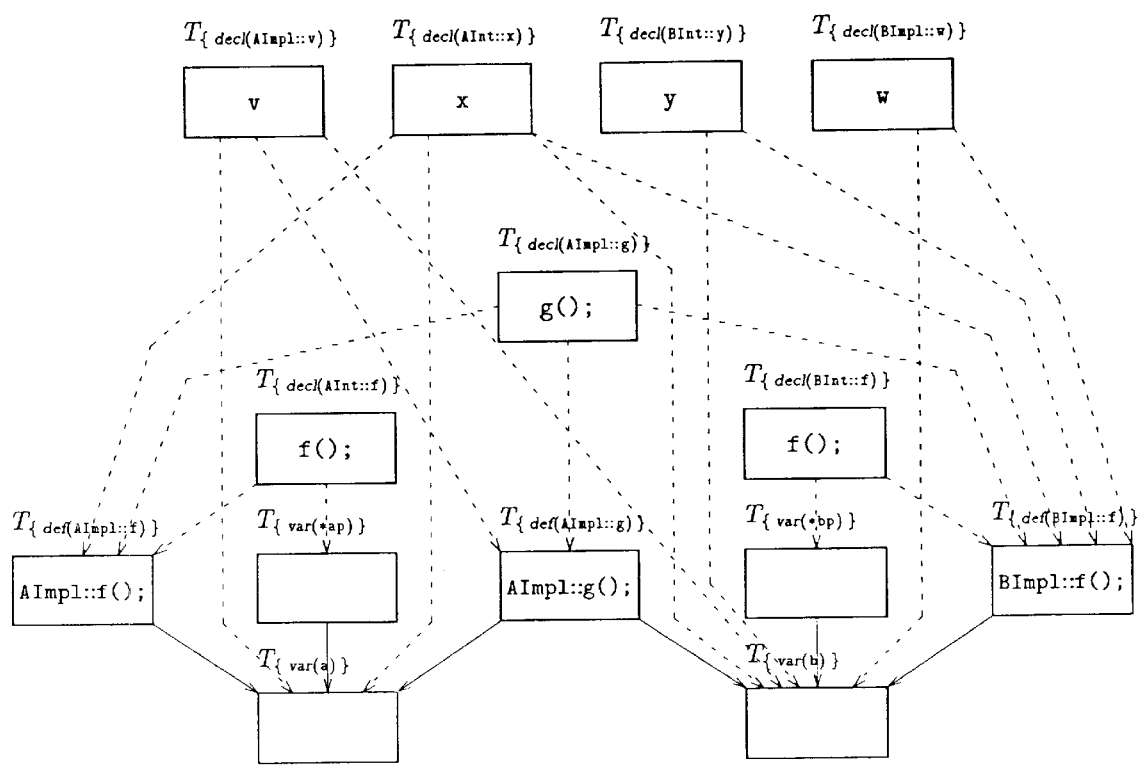
Figure 26: Specialized class hierarchy generated from the type constraints of Figure 25.

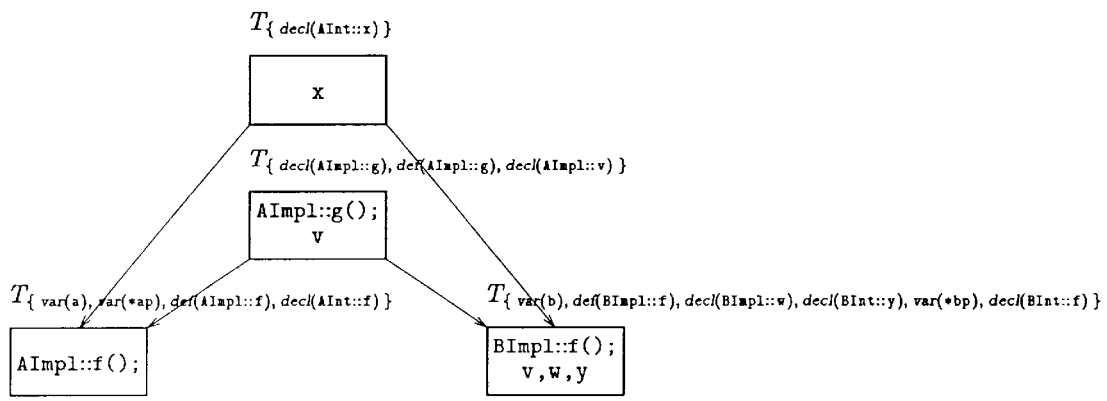
Figure 27: Class hierarchy obtained by applying the simplification rules of Figure 20 to the specialized class hierarchy of Figure 26.

```
void main(){
    T{ var(a), var(*ap), def(AImpl::f), decl(AInt::f) } a;
    a.x = 10; a.v = 20;
    T{ var(a), var(*ap), def(AImpl::f), decl(AInt::f) } *ap = &a;
    int p = ap->f();
    T{ var(b), def(BImpl::f), decl(BImpl::w), decl(BInt::y), var(*bp), decl(BInt::f) } b;
    b.x = 30; b.y = 40; b.v = 50; b.w = 60;
    T{ var(b), def(BImpl::f), decl(BImpl::w), decl(BInt::y), var(*bp), decl(BInt::f) } *bp = &b;
    int q = bp->f();
}
```

Figure 28: Updated main program for the example of Figure 23, for use with the class hierarchy of Figure 27.

RULE-BASED ENGINE FOR TRANSFORMATION OF CLASS HIERARCHY OF AN OBJECT-ORIENTED PROGRAM

The present application is related to co-pending U.S. patent application Ser. No. 08/794,986, entitled "Method and Apparatus for Slicing Class Hierarchies", filed Feb. 5, 1997 by Choi et al., and U.S. patent application Ser. No 08/942,520, entitled "Class Hierarchy Specialization", filed Oct. 2, 1997 by Tip. et al., both commonly assigned to the assignee of the present invention.

BACKGROUND OF THE INVENTION

1. Field of the Invention

The present invention generally relates to object-oriented programming (OOP), and in particular to OOP systems supporting the C++ programming language.

2. Background Description

The C++ programming language provides a number of features such as classes, class members, inheritance, multiple inheritance, and virtual inheritance. These object-oriented features have several advantages. Most importantly, they enable the creation of class libraries that can be reused in many different applications. However, such code reuse comes at a price. In order to facilitate reusability, OO programming encourages the design of classes that incorporate a high degree of functionality. Programs that use a class library typically exercise only a part of the library's functionality. Such a program may pay a performance penalty for library functionality that it does not use. This performance penalty may be due to the following reasons.

A library may contain dead executable code. Dead executable code is code that is not executed during any execution of the program, or code whose execution cannot affect the program's observable behavior. Dead executable code in an application adversely affects execution speed (both directly, through execution of redundant code, and indirectly through cache/page effects) and is hence undesirable. Dead executable code may take the form of unused library procedures. Prior art has addressed the problem of eliminating unused functions; an example of such prior art is, e.g., A. Srivastava, "Unused procedures in object-oriented programming", ACM Letters on Programming Languages and Systems, 1(4), pp. 355–364. Other prior art has focused on eliminating dead code at the statement level; see e.g., A. Aho, R. Sethi, and J. D. Ullman, "Compilers, Principles, Techniques, and Tools", Addison-Wesley, 1986, and F. Tip, "A Survey of Program Slicing Techniques", Journal of Programming Languages 3,3, (1995), pp. 121–189.

Objects may contain unnecessary data members and subobjects. Unused members and subobjects within objects have the effect of increasing the space requirements of an application. This may also result in decreased execution speed because creation/destruction of objects may require more time than is necessary (due to the construction/destruction of redundant components in objects), as well as through cache/page effects. Prior art has addressed the elimination of data members and subobjects that are not accessed during any execution of an application; see Tip et al., "Slicing Class Hierarchies in C++", Proceedings of the Eleventh Annual Conference on Object-Oriented Programming, Languages, and Applications (OOPSLA'96), (San Jose, Calif., October 1996), ACM SIGPLAN Notices 31(10), pp. 179–197. However, the prior art does not address situations where a given member is (un)used by some, but not all, instances of a given class.

Class hierarchies may unnecessarily exhibit virtual inheritance. Class hierarchies that represent extendable frameworks may exhibit virtual inheritance. The use of virtual inheritance in a program's class hierarchy increases the time require to access class members, and may increase the size of objects.

Such prior art methods that eliminate virtual inheritance are only capable of eliminating classes, eliminating inheritance relations, and replacing virtual inheritance relations with non-virtual inheritance relations, and are only applicable under certain limited situations.

SUMMARY OF THE INVENTION

The problems presented above and the related problems of the prior art are solved by the present invention, rule based engine for class hierarchy transformation. The present invention is concerned with transforming class hierarchies. This is accomplished by an analysis of the program and its class hierarchy, followed by the construction of a new class hierarchy. The new class hierarchy is constructed by transforming the class hierarchy based upon a set of transformation rules which perform one of the following operations:

i) merging of two classes;

ii) removing a virtual inheritance relation; and iii) replacing a virtual inheritance relation with a non-virtual inheritance relation.

The new class hierarchy is used to transform the program. The class hierarchy transformation is preferably generated on either a specialized class hierarchy or a class hierarchy obtained by class hierarchy slicing.

These operations preserve the original behavior of the program, and have the effect of "optimizing away" unneeded class members from objects. The invention is also capable of replacing class hierarchies that exhibit virtual inheritance with class hierarchies that only exhibit nonvirtual inheritance, and is applicable across a broad spectrum of inheritance structures. Transformation of virtual into non-virtual inheritance improves program performance because it reduces the time required to access members that are located in virtual base classes. In addition, it may reduce the space required to represent objects.

The invention is preferably used subsequent to the removal of dead or redundant executable code (i.e., program slicing). In the alternative, the invention may be used in program understanding tools, and in design tools that assist programmers in improving the design of class hierarchies.

BRIEF DESCRIPTION OF THE DRAWINGS

FIG. 3 shows an example C++ class hierarchy.

FIG. 6 shows a pseudo-code for the static lookup and typecast operations.

FIGS. 8 and 9 show pseudo-code for Step 701 of the algorithm of FIG. 7.

FIG. 10 shows pseudo-code for the sub-step of Step 701 in which classes of equivalent variables are determined.

FIG. 11 shows an example program and class hierarchy, and the information gathered by procedure DetermineBasicInfo of FIG. 8.

FIG. 12 shows for an example class hierarchy and program the equivalence classes computed by procedure DetermineEquivalenceClasses of FIG. 10.

FIG. 13 shows pseudo-code for Step 703 of FIG. 7.

FIG. 14 shows type constraints computed for the program of FIG. 11(a) by procedure ComputeTypeConstraints of FIG. 13.

FIG. 15 shows pseudo-code for Step 705(a): Construction of the Specialized Subobject Graph.

FIG. 16 shows the specialized subobject graph for the example program of FIG. 11.

FIG. 17 shows pseudo-code for Step 705(b): Construction of the Specialized Class Hierarchy.

FIG. 18 shows pseudo-code for Step 705(c): Updating the declarations in the program to reflect the new, specialized class hierarchy.

FIG. 19 shows the Specialized Class Hierarchy resulting from Step 705(b) and updated program resulting from Step 705(c) for the example program of FIG. 11.

FIG. 20 shows transformation rules for the simplification of class hierarchies.

FIGS. 21 and 22 show an illustration of the class hierarchies that result from applying the simplification rules of Section 5.4 to the specialized class hierarchy of FIG. 19.

FIG. 23 is an examplary program that exhibits virtual inheritance.

FIG. 24 illustrates basic information gathered for the examplary program of FIG. 23.

FIG. 25 illustrates type constraints computed for the program of FIG. 23.

FIG. 26 illustrates a specialized class hierarchy generated for the program of FIG. 23

FIG. 27 illustrates the result of applying the simplification rules to the specialized class hierarchy of FIG. 26.

FIG. 28 illustrates the exemplary program of FIG. 26 after updating the variable declarations.

DETAILED DESCRIPTION OF THE INVENTION

Figure 1:
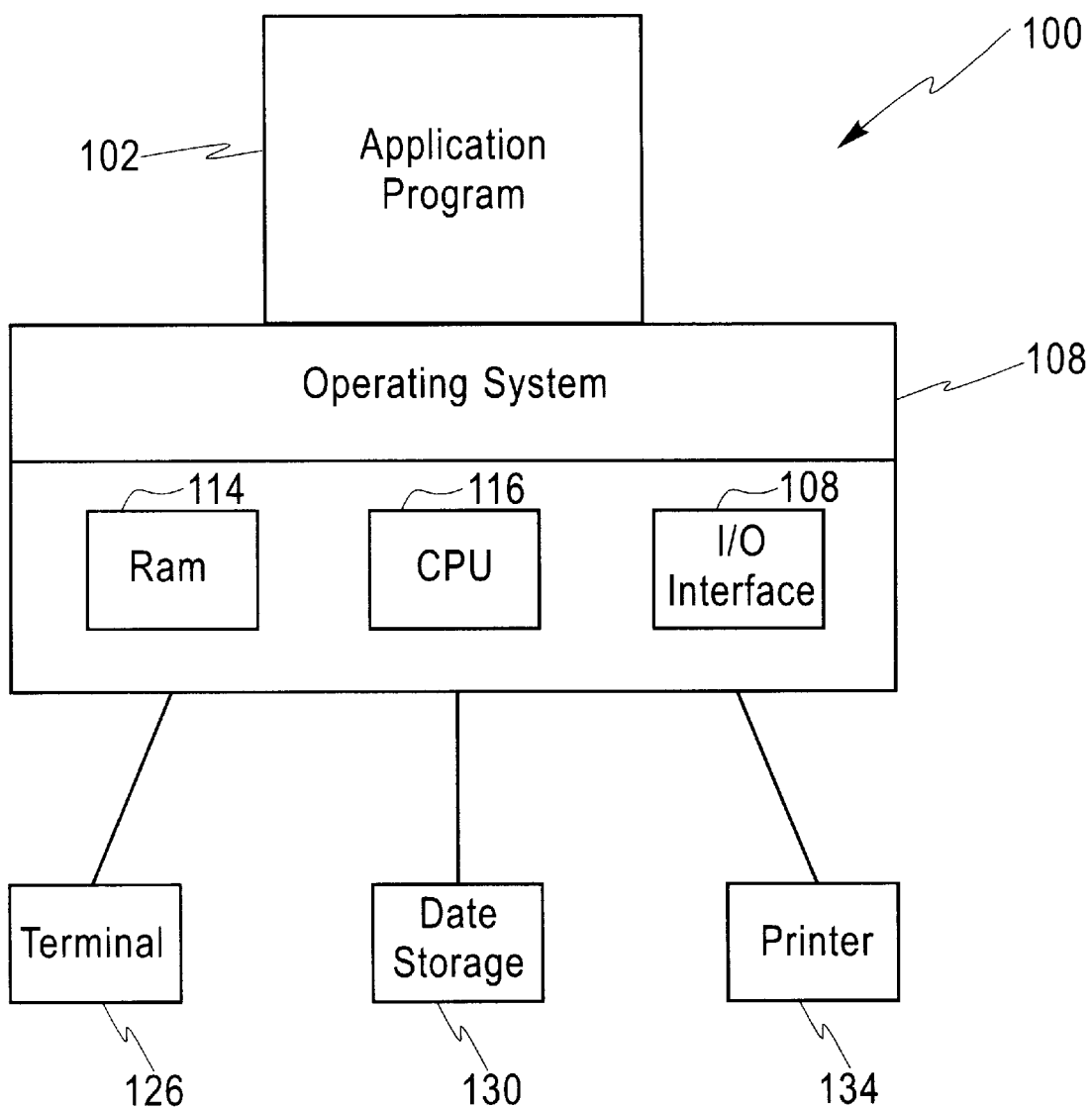
FIG. 1 illustrates an example of a computer processing system on which the present invention may be implemented

Referring now to the drawings, and more particularly to FIG. 1, there is shown a representative computer processing apparatus on which the subject invention may be implemented. The computer processing apparatus 100 includes one or more central processing units (CPUs) 116 to which are attached a random access memory (RAM) 14, 114, an input/output (I/O) adapter 118 Typically, the I/O adapter 118 interfaces to terminal 126, data storage 130, printer 134, a keyboard (not shown) a mouse (not shown) and/or other user interface devices such as a touch screen device (not shown). Such a touch screen device would optionally be installed on the terminal 126, here represented as a cathode ray tube (CRT) display but which may be a liquid crystal display (LCD) or other suitable display device.

The computer system's operating system 108 (and other utilities), application program code 102 and data are stored in persistent memory and temporarily loaded into RAM 114 for execution by the CPU 116. The persistent memory is typically provided by a do to storage 120 coupled to the CPU via an I/O adapter 118. In addition, persistent memory may be provided by resources coupled to the CPU 116 via 9 network adapter (not shown). In this case, portions of the computer system's operating system (or other utilities), and portions of the application program code and data may be retrieved from network resources and loaded into RAM 114 for execution by the CPU 116.

In order to better understand the invention, some background material is presented regarding the notion of class hierarchies and subobjects in object-oriented programming languages such as C++.

A class hierarchy specifies the following:

A set of classes,

For every class, a set of members which may either be data members or member functions; further, a member function may be either a virtual or non-virtual function, The inheritance relations among the classes; in particular, for every class, the set of base classes it inherits from is specified. The inheritance may be further qualified as virtual or non-virtual inheritance.

As an example, FIG. 3 shows a C++ class hierarchy that consists of the classes S, A, B, C, and D having the following members:

class S has (data) member y, virtual member (function) foo, and non-virtual member (function) bar, class A has (data) member x.

Class B has virtual member (function) foo and has virtual member (function) bar, class C has non-virtual member (function) bar, and class D has no members of its own.

Classes S,A,B,C, and D have the following inheritance relations:

class B inherits nonvirtually from class A, class B inherits virtually from class S, class C inherits nonvirtually from class A, and inherits virtually from class S, class D inherits nonvirtually from class B, and inherits nonvirtually from class C.

Classes are essentially descriptions of objects or class instances that may be created during program execution. Let us say a class X inherits from a class Y. The essential meaning of this inheritance relation is that every instance (object) of class X will contain an instance (object) of class Y. Consider the class hierarchy of FIG. 3, which consist of 5 classes, A, B, C, D, and S. Class B inherits from both classes A and S. Consequently, every B object will contain an A subobject as well as an S subobject. Similarly, C also inherits from A and S. Hence, every C object will also contain an A subobject as well as an S subobject.

Figure 4:
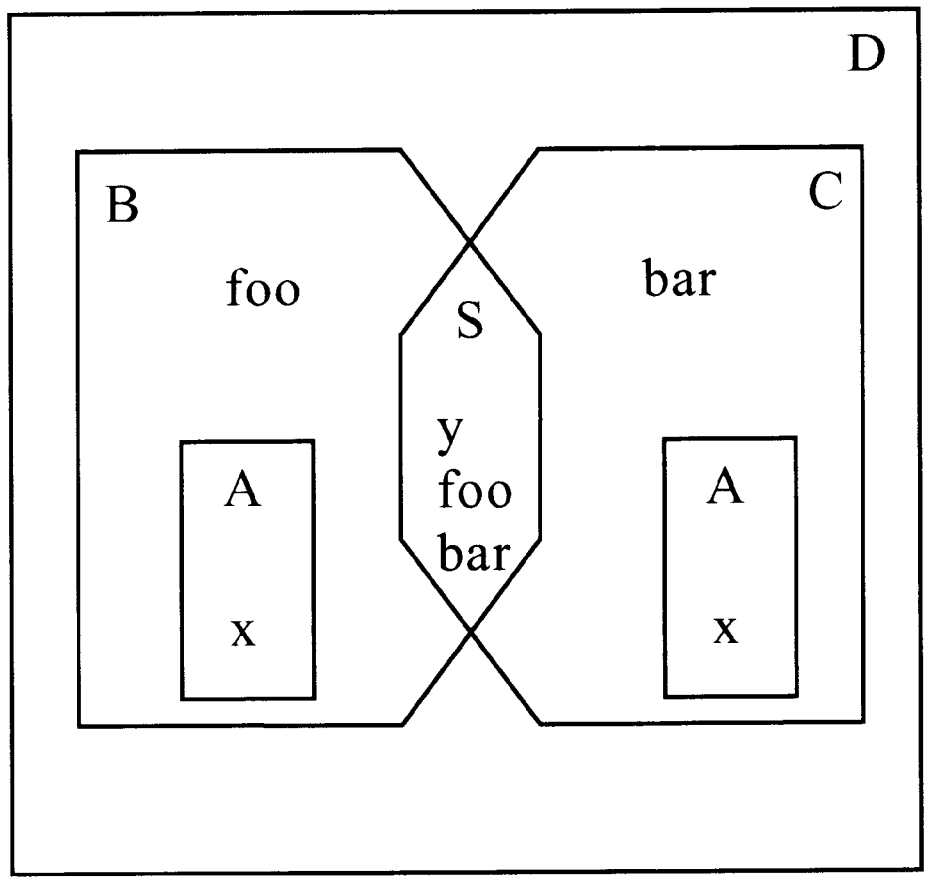
FIG. 4 is a pictorial illustration depicting the structure of an object D for the class hierarchy of FIG. 3.

There are some differences between virtual and non-virtual inheritance, which is illustrated by the structure of a D object, as shown in FIG. 4. Consider class D. Since D inherits from B and C, every D object contains a B object as a subobject and a C object as a subobject. Of course, the B subobject contained within a D object will itself, in turn, contain an A subobject and an S subobject. Similarly, the C subobject contained in a D object will itself, in turn, contains an A subobject and an S subobject. However, since B and C inherit virtually from S. both the B subobject contained within a D object and C subobject contained within the same D object will share a single, unique S subobject. In contrast, since B and C inherit non-virtually from A, each of the B and C subobjects contained within a D object contain their own A subobject. FIG. 4 depicts the structure of an object of type D. Observe that, due to a combination of virtual and non-virtual inheritance, and object of type D contains a single subobject of type S, but two distinct subobjects of type A, each of which has a distinct data member x.

For the sake of clarity, the following naming scheme will be used to refer to the various subobjects. In general, each subobject can be given a name $[Z, X_i \cdot X_{i-1} \cdot \ldots \cdot X_2 \cdot X_1]$ where $X_i$ is Z or a (direct or indirect) virtual base of Z, and $X_{i-1} \cdot \ldots \cdot X_1$ is the sequence of class names where $X_j$ is a direct non-virtual base of $X_{j+1}$. Thus, the sequence denotes the $X_1$ subobject contained within the $X_2$ subobject contained within $X_3$ subobject, and so on, contained within the $X_{i-1}$ subobject contained within the unique $X_i$ subobject contained with a Z object. The most derived class of such a subobject is Z, and the least derived class of such a subobject is $X_i$. For example, the A subobject contained within the B subobject contained within a D object is referred to as the [D, D·B·A] subobject. Likewise, [D, D·C·A] denotes the A subobject contained within the C subobject within a D object. As explained above, there is a unique S subobject within a D object since both B and C inherit virtually from S. This unique subobject is referred to as [D,S]. A more detailed description of the naming scheme may be found in J. Rossie and D. Friedman, "An algebraic semantics of subobjects", Proceedings of the Tenth Annual Conference on Object-Oriented Programming systems, Languages, and Applications (OOPSLA'95), Austin, Tex., 1995, pp. 187–199.

One defines the concept of immediately contained subobject as follows. For the example of FIG. 5, [D,D·B] and [D,D·C] are immediately contained subobjects of [D,D]; while [D,D·B·A], [D,D·C·A], and [D,S] are not immediately contained subobjects of [D,D], yet, they are indirectly contained subobjects of [D,D].

Figure 5:
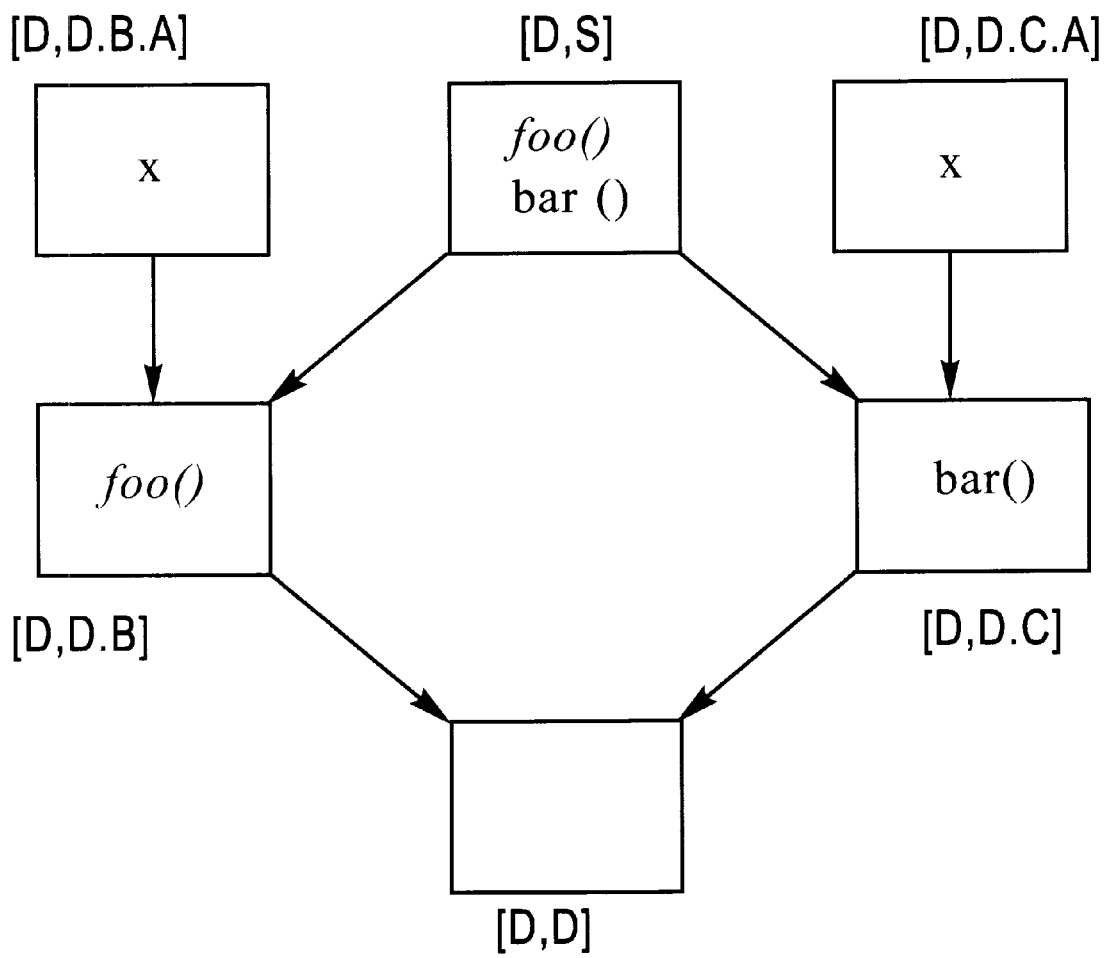
FIG. 5 is a subobject graph for the type D of FIG. 4.

The layout of objects can be depicted conveniently using a graph-based representation called the subobject graph. The subobject graph consists of a node for every subobject. Edges in the graph denote "immediate containment". In particular, the graph includes an edge from a subobject n' to another subobject n if n' is an immediately contained subject of n. FIG. 5 shows the subobject graph for type D. That is, it shows only the part of the graph consisting of all subobjects of most-derived class D.

The class hierarchy specialization technique of the present invention presented below requires member lookup and typecast information. This information can be obtained from the subobject graph, as has been reported previously in J. Rossie and D. Friedman, "An algebraic semantics of subobjects", Proceedings of the Tenth annual Conference on Object-Oriented Programming Systems, Languages, and Applications (OOPSLA'95), Austin, Tex., 1995, pp. 187–199, F. Tip, J.-D. Choi, J. Field, and G. Ramalingam, "Slicing Class Hierarchies in C++", Proceedings of the Eleventh Annual Conference on Object-Oriented Programming Systems, Languages, and Applications (OOPSLA'96), San Jose, Calif., 1996, pp. 179–197. An alternative method for obtaining lookup and typecast information that may be used is described in G. Ramalingam and H. Srinivasan, "A member lookup algorithm for C++", Proceedings of the ACM SIGPLAN'97 Conference on Programming Language Design and Implementation (PLDI'97), Las Vegas, Nev., 1997, pp. 18–30.

A subobject contains a member m if the least derived class of that subobject has a member m. Let n' be a subobject contained within another subobject n. Further, let n' contain a member m. The member m of n' is visible in n if there exists a sequence of subobjects $n_1$ to $n_k$ such that $n'=n_1$, each $n_i$ is immediately contained in $n_{i+1}$, and $n_k=n$, and none of the $n_i$ other than $n_1$ contains a member m. Otherwise, the member m of n' is said to be hidden in n. The set visible-occs(G,n,m) is defined to be the set of all subobjects contained in n that have a member m that is visible in n, for a given subobject graph G. Pseudo-code for function visible-occs is shown in FIG. 6 (lines [1]–[13]).

A static member lookup can easily be expressed in terms of function visible-occs. Function static-lookup that is shown in lines [14]–[19] of FIG. 6 first determines a set S of all subobjects containing a visible occurrence of member m, using function visible-occs. Then, the unique subobject n' in S is selected which contains all other subobjects in S. For non-ambiguous member lookups, there is always exactly one such n'. Typecasts can be modeled using the subobject graph as well. Function typecast, which is shown in lines [20]–[24] of FIG. 6 expresses the effect of a typecast from a subobject n to a class C, given a subobject graph G. This function selects the unique subobject n' contained in subobject n whose least derived class is C. For non-ambiguous typecasts, there is always exactly one such n'.

In addition, the class hierarchy specialization technique of the present invention presented below requires a composition operator on subobjects. A method for computing the composition of two subobjects $n_1$ and $n_2$ is shown in lines [25]–[33] of FIG. 6. As an example, for the class hierarchy of FIG. 3 we have that:

compose([D,D·B],[B,B·A])=[D,D·B·A]

Informally, composing the B-subobject of a D-object with the A-subobject of a B-object yields the A-subobject of a D-object.

According to the present invention, a class specialization technique is provided that eliminates redundant components from objects. More specifically, the technique detects situations where a member of a given class is used by some, but not all instances of that class, and eliminates this member from the instances where it is not needed. This is accomplished by an analysis of the program and its class hierarchy, followed by the construction of a new, specialized class hierarchy and a transformation of the program. These operations preserve the original behavior of the program, and have the effect of "optimizing away" unneeded class members from objects.

Figure 7:
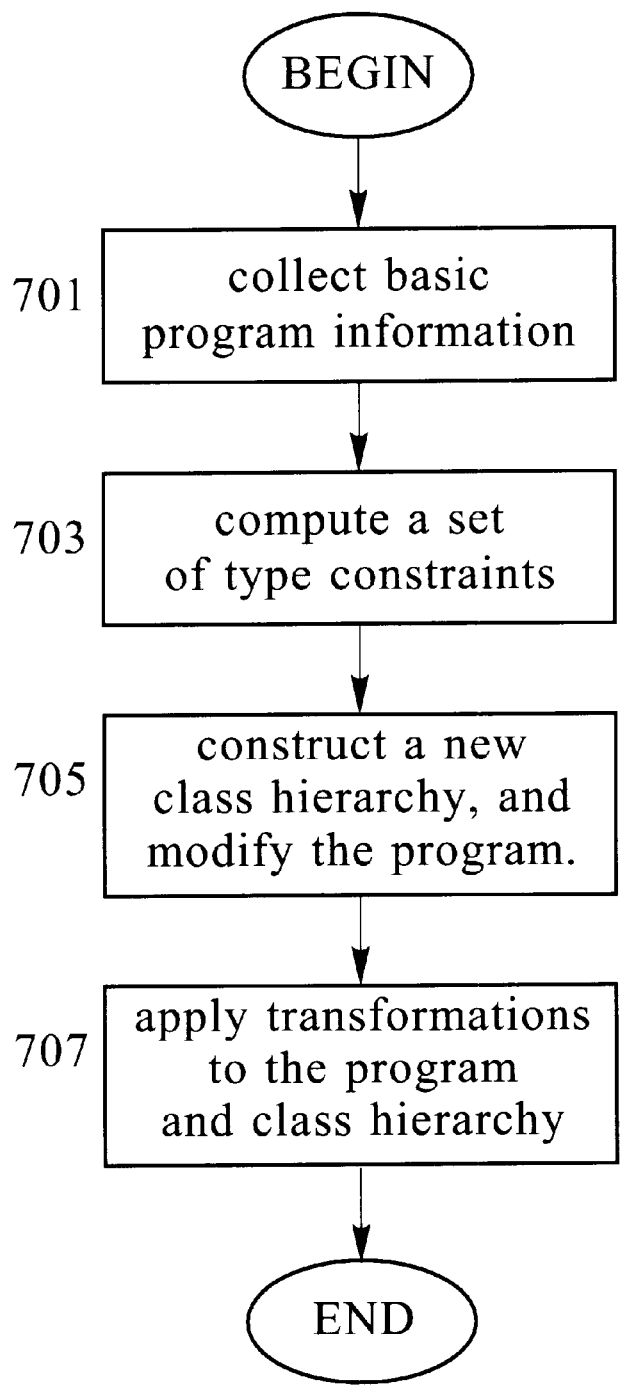
FIG. 7 shows a high-level overview of the class hierarchy specialization method.

FIG. 7 illustrates the operation of the class hierarchy specialization technique of the present invention. In step 701, basic information about the program and the class hierarchy is collected. A more detailed description of step 701 is described below with respect to FIGS. 8–12. In step 703, a set of type constraints is constructed that capture the required subtype-relationships between the types of objects, and the visibility relations between members and objects that must be retained in order to preserve program behavior. A more detailed description of step 703 is described below with respect to FIG. 13. In step 705, the type constraints computed in step 703 are used to construct a new class hierarchy, and the variable declarations in the program are changed to take into account this new hierarchy. Step 705 preferably consists of three sub-steps:

(a) A subobject graph for the new class hierarchy is constructed using the type constraints that were computed in Step 703;

(b) The new class hierarchy is constructed, using the subobject graph constructed in Step 705(a); and (c) The declarations in the program may be updated to reflect the new hierarchy that was constructed in Step 705(b); in the alternative, the object model of the program generated by a compiler may be updated to reflect the new hierarchy that was constructed in Step 705(b); in this case, the program itself may remain unaltered, but the run-time representation of the program would be updated to reflect the new class hierarchy. A more detailed description of the sub-steps of step 705 is described below with respect to FIGS. 15–19. Finally, in step 707, a set of transformation rules is applied in order to simplify the structure of the class hierarchy that was computed in Step 703. In addition, the variable declarations in the program may be updated to take into account these transformations and/or the object model of the program generated by a compiler may be updated to take into account these transformations. A more detailed description of step 707 is described below with respect to FIGS. 20–22.

Information Gathering—Step 701

FIGS. 8 and 9 illustrate pseudo-code for the operations of step 701 in which information is gathered about the program and its class hierarchy, This information includes the following:

The variables in the program whose type is a class, and the variables in the program whose type is a pointer to a class are determined. This information is stored in variables classVars and classPtrVars, respectively (see procedure DetermineVariables, lines [9]–[20] in FIG. 8).

For each variable whose type is a pointer to a class, an approximation of the set of class-typed variables that it may point to is determined. This information is stored in a set pointsTo, which contains elements of the form (p,v) indicating that pointer p may point to variable v (see procedure DeterminePointsToInfo, lines [21]–[31] in FIG. 8). Any of several existing algorithms may be used to obtain this information. Descriptions of suitable algorithms for points-to/alias analysis can be found in: B. Steensgaard, "Points-to Analysis in Almost Linear Time", Proceedings of the Twenty-Third ACM Symposium on Principles of Programming Languages (POPL'96), St Petersburg, Fla., January 1996, pp. 32–41, H. D. Pande and B. G. Ryder, "Static Type Determination and Aliasing for C++", and H. Srinivasan, "Flow-Sensitive Type Analysis for C++", Technical Report RC 20267, IBM T. J. Watson Research Center, 1995.

The (unqualified names of the) data members, nonvirtual methods, and virtual methods in the program are determined. This information is stored in sets dataMembers, nonVirtualMethods, and virtualMethods, respectively (see procedure DetermineMembers, lines [32]–[46] in FIG. 8).

The set of assignments in the program between variables whose type is a class, or a pointer to a class is determined. This information is stored in a set assignments that contains elements of the form (v,w), indicating that w is assigned to v. For assignments that involve pointers such as p=&w (p is assigned the address of variable w), the dereferenced object *p occurs in the element: (*p,w) (see procedure DetermineAssignments, lines [1]–[19] in FIG. 9).

The set of member-access operations in the program. This information is captured in a set memberAccess containing elements of the form (m,v) indicating that member m is accessed from variable v. Note that in cases where m is a virtual method and v is a pointer that may point to some variable x (determined using the pointsTo information), an additional element (m,x) occurs in memberAccess (see procedure DetermineMemberAccess Operations, lines [20]–[34] in FIG. 9).

A partitioning of the variables in classVars and classPtrVars into equivalence classes. Two variables occur in the same equivalence class if they must have exactly the same type. The purpose of these partitioning is to ensure that the constructed specialized class hierarchy contains inheritance structures that can be represented in C++. This step is only required if source code is to be generated. Alternatively, the object model of the compiler can be modified to allow for more general inheritance structures, for example, cyclic inheritance structures.

Parameter-passing in functions and class methods can be treated as a set of assignments between corresponding actual parameters and formal parameters. Return values of functions and methods can be treated as additional parameters, and hence be treated as assignments as well. In the remainder of this document, it will be assumed that the set assignments that is computed by procedure DetermineAssignments (lines [1]–[19] in FIG. 9) contains elements for parameter-passing as well as assignments. Parameter-passing in virtual method calls is handled by treating a virtual method call p 6 f($y_1, \ldots, y_n$) as a set of direct method calls x.f($y_1, \ldots y_n$) for each object x that p may point to (i.e., for each pair <p,x> that occurs in pointsTo).

For each method in a C++ program, there exists an implicitly declared pointer variable named this, which points to the object on which the method is invoked. The type of this variable is a pointer to the class containing the method. For example, the this pointer of method A::f in the program of FIG. 11(*a*) has type *A. For convenience, we will henceforth refer to the this pointer of a method C::f by the name of its method, C::f Thus, for the example of FIG. 11(*a*), A::f will be used to denote the this pointer of method A::f, and B::g will denote the this pointer of method B::g.

As an example, the basic information gathered for the program shown in FIG. 11(*a*) will be discussed.

Procedure DetermineVariables will iteratively examine all variables in the program. Variables a, b, and c will be added to the classVars because their type is class (specifically, the type of a is class A, the type of b is class B, and the type of c is class C). Variable ap will be added to classPtrVars because its type is a pointer to class A. In addition, the this pointer variables A::f, A::g, B::g, and C::f will be added to classPtrVars because their type is a pointer to a class.

Procedure DeterminePointsToInfo relies on an algorithm that performs points-to analysis. For the purpose of this example, we will assume that the following algorithm is used: for each pointer p of type *X, assume that it may point to any object of type Y, such that (i) Y=X or Y is a class transitively derived from X, and (ii) if p is the this pointer of a virtual method C::m, no definitions of m that override C::m exist in class Y. Using this simple algorithm, it can be determined that pointer ap can point to any of the objects a, b, and c; hence, elements (ap,a), (ap,a), and (ap,c) are included in pointsTo. It can also be determined that the this pointer C::f can point to object c, but not to objects a or b. Therefore, <C::f,c> occurs in pointsTo, but not <C::f,a> or <C::f,b>.

Procedure DetermineMembers iteratively examines each member in the program and, depending on the kind of member (data members, nonvirtual method, virtual method), adds it to dataMembers, nonVirtualMethods, virtualMethods. For example, data member x is added to dataMembers, and virtual method f is added to virtualMethods. The example contains no nonvirtual methods, so non VirtualMethods will be empty.

Procedure DetermineAssignments iteratively examines each assignment in the program, and if the assignment involves variables in classVars and/or classPtrVars, an abstract representation of the assignment under consideration is stored in assignments. For example, the assignment ap=&b gives rise to the incorporation of the element <*ap, b> in assignments. In addition, the call to method A::f from variable ap gives rise to the assignments A::f=&a, A::f=& b, and C::f=& c, to model the parameter-passing in this call. Consequently, elements <*A::f,a,>, <*A::f,b>, and <*C::f, c> appear in assignments.

Procedure DetermineMemberAccessOperations collects all member access operations that occur in the program, and stores an abstract representation of these operations in memberAccess. For example, the access to data member z from C::f (i.e., the this pointer of method C::f) gives rise to the inclusion of element <z,*C::f> in memberAccess. Also, the access to virtual method f from ap gives rise to an element <f,*ap>. In addition, since f is virtual and ap may point to a, b, or c, elements <f,a>, <f,b>, and <f,c>, occur in memberAccess.

A summary of the basic information gathered for the example program of FIG. 11(a) is shown in FIG. 11 (b).

In order to obtain specialized class hierarchies consisting of valid C++ code, it is necessary to determine which variables must have exactly the same type in the specialized class hierarchy. In the absence of such information, the generated hierarchy might be invalid, e.g., because it contains cycles. Procedure DetermineEquivalenceClasses, which is shown in FIG. 10 (lines [1]–[21]), shows pseudo-code for partitioning the variables in classvars and classPtrVars into equivalence classes. On line [3], the subobject graph G for program P is determined. On lines [4]–[6], the partitioning is initialized by creating a distinct equivalence it class |x| for each variable x. Then, on lines [7]–[10], the equivalence classes of two variables v and w are merged if one is (indirectly) assigned to the other and vice versa.

On lines [1]–[13], the equivalence classes of two variables v and w are merged if there exist elements <x,v> and <x,w> in assignments for some variable x whose type is a replicated class. The set of replicated classes is determined by auxiliary procedure ReplicatedClasses, which is shown on lines [22]–[31]. Intuitively, a class X is replicated if there exists some subobject n that contains two distinct subobjects with least derived class X.

Returning to the description of procedure DetermineEquivalenceClasses, on lines [14]–[16], the equivalence classes of two variables v and w are merged if v and w access a data member m that occurs in a replicated class, or if v and w access a virtual method m that occurs in a replicated class, and v and w are both variables in classvars. On lines [17]–[19], the equivalence classes of two variables v and w are merged if v and w access a non-virtual method m that occurs in a replicated class, or if v and w access a virtual method m that occurs in a replicated class and v and w are both variables in classVars.

The purpose of partitioning the variables is to ensure that valid C++ source code can be generated. If obtaining source code for the specialized class hierarchy is not required, an alternative approach to the step of partitioning variables into equivalence classes would be to modify the C++ compiler so that it can handle a wider range of inheritance structures, including cyclic inheritance relations.

Consider the class hierarchy and of FIG. 12(a). Initially, each variable occurs in an equivalence class by itself. The equivalence classes of variables ap1 and ap2 are merged because data member x, which is accessed from both of these variables, occurs in class A, which is a replicated class. The equivalence classes of variables cp1 and cp2 are merged because cp1 is assigned to cp2, and vice versa. The resulting partitioning is shown if FIG. 12(b).

Computing Type Constraints—Step 703

A set of type constraints is computed in step 703. These constraints capture the subtype-relationships between variables and members that must be retained by the specialized class hierarchy, which is discussed below, in order to preserve the program's behavior. Preferably, such type constraints are represented by 3-tuples of the form <S,n,T> where S and T are sets with elements of the form:

var(v), for some variable v in classVars. This indicates the type of variable v.

var(*p), for some variable p in classPtrVars. This indicates the type of expression *p.

decl(A::f), for some member A::f. This indicates the class in which the declaration of member A::f occurs.

def(A::f), for some member A::f. This indicates the class in which the definition of member A::f occurs.

Intuitively, a type constraint <S,n,T> expresses the fact that each element in set S has the same type as the n-subobject of each element in set T.

Type constraints are derived from assignments, member access operations, and hiding/dominance relations between members in the program. FIG. 13 (lines [1]–[7]) illustrates pseudo-code for a procedure ComputeTypeConstraints that computes the required set of type constraints by computing the original subobject graph G of program P (line [3]), and calling 3 auxiliary procedures ComputeAssignmentTypeConstraints, ComputeMemberAccessTypeConstraints, and ComputeDominanceTypeConstraints.

Procedure ComputeAssignmentTypeConstraints (lines [16]–[27]) computes the set of type constraints assignTC that are due to assignments in the program. On line [18], assignTC is initialized with the empty set. Then, on lines [19][26] the procedure iteratively selects each assignment <x,y> in the previously computed set assignments, and performs the following actions:

on line [20] the type of left-hand side x in the program is assigned to X, on line [21] the type of right-hand side y in the program is assigned to Y, on line [22], a type-cast from subobject [Y,Y] to type X is executed, resulting in a subobject n, on line [23], a set S, consisting of all elements Elem(x') is determined, where x' is an element of the equivalence class |x|, on line [24], a set T. consisting of all elements Elem(y') is determined, where y' is an element of the equivalence class |y|, on line [25], an element <S,n,T> is added to assignTC. The Elem auxiliary function that is used here is defined on lines [8]–[15] of FIG. 13. Elem takes one argument, which is a variable x, and returns:

def(x) if x is the this pointer *X::f of a method X::f, and var(x), otherwise.

Procedure ComputeMemberAccessTypeConstraints (lines [28]–[43]) computes the set of type constraints due to member access operations in the program. On line [30], memberAccessTC is initialized with the empty set. Then, on lines [31]–[42] the procedure iteratively selects each member access operation <m,y> in the previously computed set memberAccess, and performs the following actions:

on line [32], the type of receiver expression y is assigned to Y, on line [33], a static lookup for member m from subobject [Y,Y] is executed, resulting in a subobject n, on line [34], the least derived class of this subobject n is assigned to X, on lines [35]–[39], a set S is computed, whose contents depend on y and m as follows:

if y is a pointer variable in classPtrVars, or if m is a data member in dataMembers S consists of the singleton set {decl(X::m)} (line [36])

otherwise, S contains all elements Elem(x'), where x' occurs in the equivalence class |x::m| (line [38])

on line [40], a set T is computed containing all elements Elem(y'), where y' occurs in the equivalence class |y| on line [41], a constraint <S,n,T> is added to memberAccessTC

Procedure ComputeDominanceTypeConstraints (lines [44]–[59]) computes the set of type constraints due to hiding/dominance relations between members with the same name in the original class hierarchy. On line [46], dominanceTC is initialized with the empty set. Then, on lines [47]–[58] the procedure iteratively selects each pair of subobject n', n, such that (1) n'=n, or n' is contained in n, (2) the least derived class of n' is A, (3) the least derived class of n is B, and (4) A and B both contain some member m, and executes the following instructions:

on line [48], a set $S_{decl}$ is constructed containing the element decl(A::m)

on line [49], a set $T_{decl}$ is constructed containing the element decl(B::m)

on line [50], a set $S_{def}$ is constructed all elements Elem (x'), where x' occurs in the equivalence class |A::m|, on line [51], a set $T_{def}$ is constructed all elements Elem (y'), where y' occurs in the equivalence class |B::m|, on line [52], the subobject n" is determined such that n'=compose (n,n")

on line [53], a type constraint <$S_{decl}$, n", $T_{def}$> is added to dominanceTC, if A≠B, the following instructions are executed on line [55], a type constraint <$S_{decl}$,n", $T_{decl}$> is added to dominanceTC, on line [56], a type constraint <$S_{def}$,n", $T_{def}$> is added to dominanceTC.

Some examples that illustrate the computation of type constraints will be presented now.

First, consider the computation of a type constraint due to an assignment, for example, the element <*ap,b> in assignments. On line [20] of procedure ComputeAssignmentTypeConstraints, type A is assigned to X because *ap has type A in the original program. Similarly, type B is assigned to Y on line [21]. On line [22], the subobject [B,B·A]=typecast(G, [B,B], A) is assigned to n. On line [23], S is assigned the set {var(ap)}, since the equivalence class for variable ap consists of {ap} and we have that Elem(*ap)=var(*ap). On line [24], T is assigned the set {var(b)}, since the equivalence class for variable b consists of {b} and we have that Elem(b)=var(b). On line [25], the type constraint <{var(*ap)}, [B,B·A], {var(b)}> is added to assignTC.

Next consider the computation of a type constraint due to a member access, for example, the element <f,*ap> in memberAccess. On line [32] of procedure ComputeMemberAccessTypeConstraints, type A is assigned to Y because *ap has type A in the original program. On line [33], the subobject [A,A]=static-lookup(G, [A,A],f ) is assigned to n. On line [34], the least derived class A, of n is assigned to X. Since *ap occurs in classPtrVars, the condition on line [35] evaluates to "true", and consequently line [35] is executed. The execution of line [36] results in the assignment of the set {decl(A::f)} to S, since the equivalence class of A::f consists of {A::f}, and Elem(A::f) consists of decl(A::f). On line [40], the set {var(ap)} is assigned to T. On line [41], the type constraint <{decl(A::f)}, [A,A], {var(*ap)}> in memberAccessTC.

Next, consider the computation of a dominance-related type constraint. For example, refer to the subobjects n'=[C, C·B·A] and n=[C,C] in the class hierarchy of FIG. 11(a). Observe that the least derived classes of n' and n, A and C respectively, both contain member f. Therefore, lines [48]–[57] of procedure ComputeDominanceTypeConstraints are executed with A=A, B=C, and m=f. On line [48], the set {decl(A::f)} is assigned to $S_{decl}$. On line [49], the set {decl(C::f)} is assigned to $T_{decl}$. On line [50], the set {def(A::f)} is assigned to $S_{def}$, since the equivalence class of A::f consists of {A::f}, and Elem(A::f)=def(A::f). On line [51], the set {def(C::f)} is assigned to $T_{def}$, since the equivalence class of C::f consists of {C::f}, and Elem(C::f)= def(C::f). On line [52], the subobject n"=[C,C·B·A] is determined. On line [53], the type constraint <{decl(A::f)}, [C,C·B·A], {def(C::f)}> is added to dominanceTC. Since A≠C, the condition on line [54] evaluates to "true", and lines [55]–[56] are executed. On line [55], a constraint <{decl (A::f)}, [C,C·B·A], {decl(C::f)}> is added to dominanceTC. On line [56], a constraint <{def(A::f)}, [C,C·B·A], {def (C::f)}> is added to dominanceTC. FIG. 14 summarizes the type constraints that are computed by procedure ComputeTypeConstraints of FIG. 13 for the example program of FIG. 11(a), using the program information that was shown in FIG. 11(b).

Construction of the Specialized Class Hierarchy—Step 705

As discussed above, in sub-step (a) of step 705, a subobject graph for the new class hierarchy is constructed using the type constraints that were computed in Step 703. The graph generated in Step 705(a) is referred to as a subobject graph, because it can be interpreted as such in a straightforward manner. Nodes in the constructed graph correspond to subobjects, although the labels of the nodes are different from the previously described subobjects. The reason for using a nonstandard notation for subobjects here is that it makes the description of this step of the method considerably easier. Edges in the constructed graph correspond directly to the containment relation between subobjects, and the set of members of each subobject can be inferred directly from the corresponding node label. The standard methods for static lookup and type cast can be utilized on specialized subobject graphs.

FIG. 15 illustrates pseudo-code for generating the specialized subobject graph. The nodes of the specialized subobject graph are of the form $T_{S, n, U}$, where n is a subobject of the original class hierarchy, and where S and U are sets containing elements of the form:

var(v), where v is a variable in classVars or in classPtrVars, but not the this pointer of a method, decl(C::m), where C::m is a member in the original class hierarchy, or deft(C::m), where C::m is a member in the original class hierarchy.

On line [3], the sets of nodes and edges of the specialized subobject graph are initialized to be empty. Then, nodes are added to the graph using a worklist-algorithm on lines [4]–[21]. On line [4], the worklist is initialized as the empty set of nodes. Then, on lines [5]–[10] a node $T_{S,n,S}$ is added to the worklist, where S is the equivalence class for a variable v that occurs in the set class Vars; here, n denotes the subobject [V,V], where V is the type of variable v in the original class hierarchy.

Lines [11]–[21] consist of a loop in which the following steps are executed as long as the worklist is non-empty:

a node $x \equiv T_{T,n1,U}$ is selected from the worklist (line [12]), node x is removed from the worklist (line [13]), node x is added to the set N of nodes of the specialized subobject graph (line [14]), for each type constraint $<S,n_2>$ in assignTC or memberAccessTC, the following instructions are executed:

a node $x':=T_S$, $compose(n_1,n_2),_U$ is constructed (line [16]), if x' was not visited earlier, it is added to the worklist. The compose operation is described above with respect to lines [25]–[33] of FIG. 6.

Then, in lines [22]–[24], edges are added to the set E of edges in the specialized subobject graph. For each pair of nodes $x' \equiv T_{S,n,U}$, and $x \equiv T_{T,n1,U}$ in N such that there exists a type constraint $<S,n_2,T>$ in assignTC, memberAccessTC, or dominanceTC, an edge $x' \to x$ is added to E (line [22]).

Finally, in lines [25]–[32], members are added to the nodes N of the specialized subobject graph. For each node x of the form $T_{S,n,U}$, members are added to x depending on the elements of S:

for each element decl(A::f) in S, the declaration of method A::f (as it occurred in the original class hierarchy) is added to node x (lines [26]–[28]).

for each element def(A::f) in S, the definition of method A::f (as it occurred in the original class hierarchy) is added to node x (lines [29]–[31]).

In the construction of the specialized class hierarchy, two auxiliary functions that operate on the specialized subobject graph will be required. Lines [35]–[38] of FIG. 15 introduce a function ldc, which determines the least derived class of a subobject in the specialized subobject graph. Similarly, lines [39]–[42] introduce a function mdc, which determines the most derived class of a subobject in the specialized subobject graph. These functions will be used in Step 705(b).

As an example, consider how some of the nodes and edges are added to the specialized subobject graph with respect to variable b of the program of FIG. 11(a). Since the type of b is the class B, variable b occurs in classvars. Therefore lines [6]–[9] are executed with v=b. On line [6], V is assigned the type B of b. On line [7], the n is assigned the subobject [B,B]. On line [8], the equivalence class {b} associated with variable b is determined. On line [9], the node $T_{\{var(b)\},[B, B],\{var(b)\}}$ is added to workList.

Now suppose that during the execution of the loop on lines [11]–[21], node $x = T_{\{var(b)\},[B, B],\{var(b)\}}$ is selected from the worklist (on line [12]. This implies that T={var(b)}, $n_1$=[B,B], and U={var(b)}. On line [13], x is removed from the worklist. On line [14], x is added to N. During the execution of the for-loop on lines [15]–[20], the following constraints are selected from assignTC and memberAccessTC.

<{var(*ap)},[B,B·A],{var(b)}>. This implies that S {var (*ap)} and $n_2$=[B,B·A]. Since $compose(n_1,n_2)$=[B,B·A], a node $x' \equiv T_{\{var(ap)\},[B, B·A],\{var(b)\}}$ is constructed on line [16]. Since this node does not yet occur in either N or on the worklist, it is added to the worklist.

<{def(A::f)},[B,B·A],{var(b)}> This implies that S={def (A::f)} and $n_2$=[B, B·A]. Since compose $(n_1,n_2)$=[B, B·A], a node $x' \equiv T_{\{def(A::f)\},[B,B·A], \{var(b)\}}$ is constructed on line [16]. Since this node does not yet occur in either N or on the worklist, it is added to the worklist.

<{def(B::g)},[B,B],{var(b)}>. In this case, S={def(B::g)} and $n_2$=[B,B].

Since $compose(n_1,n_2)=[B,B]$, a node $x'=T_{\{def(B::g)\},[B,B],\{var(b)\}}$ is constructed on line [16]. Since this node does not yet occur in either N or on the worklist, it is added to the worklist.

In subsequent iterations of the while-loop on lines [11]–[21] each of these nodes is selected, added to N. removed from the worklist, and as a result of "processing" these nodes, other nodes may be added to the worklist. Eventually, this while-loop terminates because the worklist is empty. At that point, N contains the full set of nodes of the specialized subobject graph.

As an example of edges that are added to the specialized subobject graph, consider an iteration of the loop on lines [22]–[24] where $x' = T_{\{def(A::f), [B,B·A],\{var(b)\}\}}$ and x=T{var(b)},[B,B],{var(b)}. Since there exists a type constraint <{def(A::f)},[B,B·A],{var(b)}> in assignTC, an edge $x' \to x$ is added to E on line [23].

As an example of a member being added to the specialized subobject graph, consider node $T_{\{def(A::f)\},[B,B·A],\{var(b)\}}$. On line [30], the definition of method A::f as it occurred in the original class hierarchy is added to this node.

FIG. 16 shows the entire specialized subobject graph of FIG. 11.

In substep (b) of step 705, a new class hierarchy, which is denoted a specialized class hierarchy, is constructed using the subobject graph constructed in step 705(a). This new class hierarchy contains classes $T_S$, where S is a set containing elements of the form:

var(v), where v is a class-typed variable that occurs in classVars.

var(*p), where p is a pointer-to-class-typed variable that occurs in classPtrVars.

decl(A::f), where A::f is a method in the original hierarchy.

def(A::f), where A::f is a method in the original hierarchy. Intuitively, class $T_S$ represents the type of all elements in S in the specialized class hierarchy. The construction of the classes of the specialized class hierarchy, and the required inheritance relations between them relies on the previously constructed specialized subobject graph.

FIG. 17 shows pseudo-code for a function ConstructSpecializedHierarchy that constructs the specialized class hierarchy. The new class hierarchy H is initially empty (line [3]). Then, the specialized subobject graph G is computed on line [4], through a call to function ConstructSpecializedSubObjectGraph. Subsequently, on lines [5]–[7], for each node n in G, a class ldc(n) is added to the specialized class hierarchy (note that the ldc function used here was defined on lines [35]–[38] of FIG. 15). In lines [8]–[15], members are add to the classes of the specialized hierarchy. For each class $T_S$, declarations and definitions of members are added to that class depending on the elements of S. For each element decl(A:f) in S, a declaration of member A::f is added to class $T_S$ on lines [9]–[11]. Similarly, for each element def(A::Y) in S, a definition of method A::f is added to class $T_S$ on lines [12]–[14]. In lines [16]–[22] the required inheritance relations are added to the specialized class hierarchy. For each edge $x' \to x$ in the specialized subobject graph G, an inheritance relation is added between class ldc(x') and class ldc(x'). There are two cases:

A virtual inheritance relation is added on line [16] between class ldc(x') and class ldc(x) if the auxiliary function isVirtual returns "true".

A non-virtual inheritance relation is added on line [18] between class ldc(x') and class ldc(x) if the auxiliary function isVirtual returns "false".

The auxiliary function isVirtual is defined on lines [25]–[32]. Given an edge x'→x in the specialized subobject graph G isVirtual returns true if there are nodes $x_1, x_2, x_3, x_4$ in G such that all of the following conditions hold:

1. the least derived class ldc(x') of x' is the same as the least derived class ldc($x_1$) of $x_1$,
2. the least derived class ldc(x) of x is the same as the least derived class ldc($x_1$) of $x_1$,
3. there is an edge $x_1 \to x_2$ in G,
4. there is an edge $X_1 \to X_3$ in G for some $X_3$ other than $x_2$,
5. there is a path from $x_2$ to $x_4$ in G, and
6. there is a path from $X_3$ to $X_4$ in G.

Otherwise, isVirtual returns "false".

An example is now presented that illustrates how some parts of the specialized class hierarchy are constructed. The specialized subobject graph that is shown in FIG. 16 contains nodes: $T_{\{var(b)\},[B,B],\{var(b)\}}$, $T_{\{var(*ap)\},[B,B\cdot A],\{var(b)\}}$, $T_{\{decl(A::f)\},[B,B\cdot A],\{var(b)\}}$, and $T_{\{def(A::f)\},[B,B\cdot A],\{var(b)\}}$. For these 4 nodes, the loop on lines [5]–[7] of procedure ConstructSpecializedClassHierarchy adds the following classes to the specialized hierarchy: $T_{var(\{b\})}$, $T_{var(\{*ap\})}$, $T_{decl\ (\{A::f\})}$, and $T_{def(\{A::f\ \})}$. Then, on lines [9]–[11], a declaration of method A::f is added to class $T_{decl(\{A:f\})}$, and on lines [12]–[14] a definition of method A::f is added to class $T_{def(\{A::f\})}$.

On lines [16]–[22], an inheritance relation is added to the specialized class hierarchy for each edge in the specialized subobject graph G. We will now study the effect of these lines for the following edges that occur in G:

$T_{\{var(*ap)\},[B,BA],\{var(b)\}}$, $T_{\{var(b)\},[B,B],\{var(b)\}}$. Since there are no nodes $x_1, X_2, x_3, x_4$ in G for which all of the conditions of line [27] hold, class $T_{var(\{*ap\})}$ made a non-virtual base class of class $T_{var(\{b\})}$ on line [18].

$T_{\{def(A::f)\},[B,B\cdot A],\{var(b)\}} \to T_{\{var(b)\},[B,B],\{var(b)\}}$. Since there are no nodes $x_1, x_2, x_3, x_4$ in G for which all of the conditions of line [27] hold, class $T_{def(\{A::f\})}$ is made a non-virtual base class of class $T_{var,(\{b\})}$ on line [18].

$T_{\{decl(A::f)\},[B,B\cdot A],\{var(b)\}} \to T_{\{var(*ap)\},[B,B\cdot A],\{var(b)\}}$. Since there are nodes $X_1 = T_{\{decl(A::f)\},[B,B\cdot A],\{var(b)\}}$, $X_2 = T_{\{var(*ap)\},[B,B\cdot A],\{var(b)\}}$, $X_3 = T_{\{def(A::f)\},[B,B\cdot A],\{var(b)\}}$, and $X_4 = T_{\{var(b)\},[B,B],\{var(b)\}}$ for which all of the conditions of line [27] hold, class $T_{decl(\{A::f\})}$ is made a virtual base class of class $T_{var(\{*ap\})}$ on line [18].

$T_{\{decl(A::f)\},[B,B\cdot A],\{var(b)\}} \to T_{\{def(A::f)\},\{B,B\cdot A\},\{var(b)\}}$. Since there are nodes $X_1 = T_{\{decl(A::f)\},[B,B\cdot A]\},\ \{var(b)\}}$, $X_2 = T_{\{def(A::f)\},[B,B\cdot A],\{var(b)\}}$, $X_3 = T_{\{var(*ap)\},[B,B\cdot A],\{var(b)\}}$, $X_4 = T_{\{var(b)\},[B,B],\{var(b)\}}$ for which all of the conditions of line [27] hold, class $T_{decl(\{A::f\})}$ is made a virtual base class $T_{def(\{A::f\})}$ on line [18].

FIG. 19 shows the entire specialized class hierarchy that is constructed by procedure ConstructSpecializedClassHierarchy of Step 705(b).

Finally, in sub-step (c) of step 705, the declarations in the program may be updated to reflect the new class hierarchy that was constructed in sub-step (b) of step 705. This is accomplished by giving type $T_{var(S)}$ to each variable v in classVars, where S is the equivalence class containing variables v. Similarly, type $*T_{var(S)}$ is given to each variable p in classPtrVars, where S is the equivalence class containing variables p. Pseudo-code for sub-step (c) of step 705 is shown in FIG. 18. On lines [3]–[6] of FIG. 18, variable a gets type $T_{var(\{a\})}$, and on lines [7]–[10], variable ap gets type $*T_{var(\{ap\})}$. FIG. 19 shows the updated program produced by procedure UpdateDeclarations of Step 705(c). In the alternative, in sub-step (c), the object model of the program generated by a compiler may be updated to to reflect the new hierarchy that was constructed in Step 705(b). In this case, the program itself may remain unaltered, but the run-time representation of the program would be updated to reflect the new class hierarchy.

Simplification of the Specialized Class Hierarchy—Step 707

In step 707, a set of transformation rules is applied to the specialized class hierarchy generated in step 705. FIG. 20 illustrates an example of such transformation rules. The effect of these transformations is a simplification of the inheritance structure, which may result in a reduction in the number of compiler-generated fields in objects, and hence in a reduction of object size. It is important to realize that the number of explicit (i.e., user-defined) members contained in each object is not affected by the transformations, with the exception that a member's declaration and definition may be merged. The conditions of the rules of FIG. 20 are designed in such a way that classes are only merged if no object in the program becomes larger (i.e., contains more members) as a result of the merge.

In Rule 1 of FIG. 20, the "merging" of two classes X and Y (where X is a base class of y) involves the following steps:

1. A new class Z is created that (virtually, nonvirtually) inherits from all (virtual, nonvirtual) base classes of X and Y. and that contains all members of X and Y.
2. Each virtual class Z' that inherits from X or Y is made to inherit from Z instead. This inheritance relation is virtual if the inheritance relation between X and Y or the inheritance relation between Y and Z' is virtual; otherwise it is nonvirtual.
3. All variables of type X and Y are given type Z, and all variables of type X* and Y* are given type Z*.
4. Classes X and Y are removed from the hierarchy.

Rules 2 and 3 are self-explanatory.

In order to understand the transformation of a specialized class hierarchy, consider the specialized class hierarchy illustrated in FIG. 19. FIG. 21(a) depicts this class hierarchy before any transformations have been performed. In FIG. 21(b), the class hierarchy is shown after:

merging class $T_{\{decl(A::x)\}}$ with class $T_{\{def(A::g)\}}$ (Rule 1),
merging class $T_{\{decl(B::y)\}}$ with class $T_{\{def(B::g)\}}$ (Rule 1),
merging class $T_{\{decl(C::z)\}}$ with class $T_{\{def(C::f)\}}$ (Rule 1),
eliminating the inheritance relation between class $T_{\{decl(A::g)\}}$ and class $T_{\{def(B::g)\}}$ (Rule 2), and
merging class $T_{\{decl(A::f)\}}$ with class $T_{\{var(*ap)\}}$ (Rule 1).

FIG. 21(c) depicts the class hierarchy after:

eliminating the inheritance relation between class $T_{\{decl(A::f),var(*ap)\}}$ and class $T_{\{var(a)\}}$ (Rule 2),
eliminating the inheritance relation between class $T_{\{decl(A::f),var(*ap)\}}$ and class $T_{\{var(b)\}}$ (Rule 2),
eliminating the inheritance relation between class $T_{decl(A::f),var(*ap)\}}$ and class $T_{\{var(c)\}}$ (Rule 2),
merging class $T_{\{decl(A::x),def(A::g)\}}$ with class $T_{\{var(a)\}}$ (Rule 1), and
merging class $T_{\{decl(C::z),def(C::f)\}}$ with class $T_{\{var(C)\}}$ (Rule 1).

FIG. 22(a) shows the hierarchy after:

eliminating the inheritance relation between class $T_{\{decl(A::g)\}}$ and class $T_{\{decl(A::x),def(A::g),var(a)\}}$ (Rule 2),
eliminating the inheritance relation between class $T_{\{decl(B::g)\}}$ and class $T_{\{decl(C::z),def(C::f),var(c)\}}$ (Rule 2),
merging class $T_{\{decl(B::g)\}}$ and class $T_{\{decl(B::y),def(B::g)\}}$ (Rule 1), and merging class $T_{\{decl(A::f),var(*ap)\}}$ and class $T_{\{def(A::f)\}}$ (Rule 1). FIG. 22(b) shows the hierarchy after merging class $T_{\{decl(A::g)\}}$ and class $T_{\{var(*ap), def(A::f)\}}$ (Rule 1). FIG. 22(c) shows the hierarchy after:

eliminating the inheritance relation between class $T_{\{decl(A::g),var(*ap),def(A::f)\}}$ and class $T_{\{var(b)\}}$ (Rule 2), eliminating the inheritance relation between class $T_{\{decl(A::g),var(*ap),def(A::f)\}}$ and class $T_{\{decl(C::z),def(C::f), var(c)\}}$ (Rule 2), and merging class $T_{\{decl(B::Y),def(B::g)\}}$ and class $T_{\{var(b)\}}$ (Rule 1).

The final result, shown in FIG. 22(d) is obtained by replacing all virtual inheritance relations by nonvirtual relations (three applications of Rule 3).

In step 707, the variable declarations in the program may be updated to take into account the transformations described above. In the alternative, the object model of the program generated by a compiler may be updated to take into account these transformations. In this case, the program itself may remain unaltered, but the run-time representation of the program would be updated to reflect the new class hierarchy.

For example, when the original, specialized and simplified versions of the program of FIG. 11 are compiled using the the IBM x1C compiler running on an RS/6000 workstation with AIX 4.1, the sizes of the objects are as follows:

|  | original | specialized | simplified |
|---|---|---|---|
| object a | 8 bytes | 52 bytes | 8 bytes |
| object b | 12 bytes | 68 bytes | 8 bytes |
| object c | 16 bytes | 76 bytes | 12 bytes |

Notice that, as a result of applying the current invention, the size of objects b and c is reduced from 12 bytes to 8 bytes, and from 16 bytes to 12 bytes, respectively. The size of object a remains the same at 8 bytes. Note that in the intermediate result (before applying the simplification rules) the sizes of all 3 objects are much larger than before because of an abundance of virtual inheritance in the generated class hierarchy.

Figure 2:
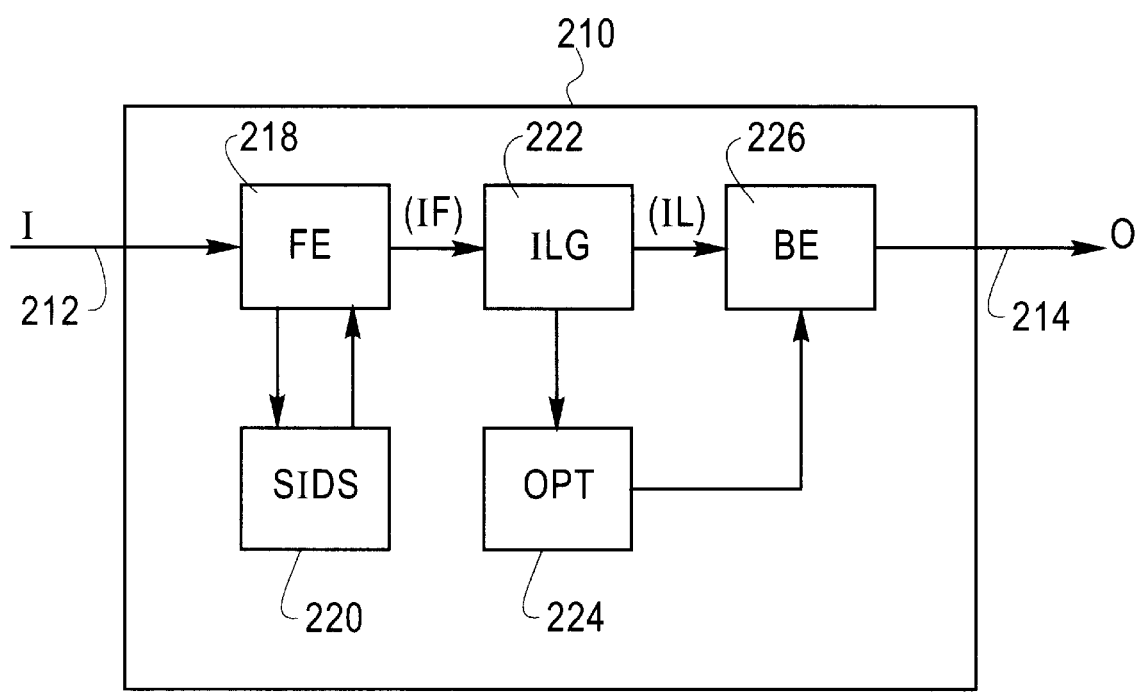
FIG. 2 is a functional block diagram of a compilation routine on which the present invention may be implemented.

The class hierarchy specialization mechanism of the present invention may be used in the compilation of program in order to reduce the space and time requirements of the program. A compiler is application program code that compiles a source program thereby generating a run-time representation of the source program. As shown in FIG. 2, the compilation process 210 accepts as an input (I) 212 a source program, and operates on it to an end of generating an output (O) 214 comprising a run-time representation of the source program. The run-time representation is typically executable on a specific computer architecture. The compilation process typically includes front end processing (FE) 218, a symbol table 220 for recording information about symbols in the input program, intermediate language generation (ILG) 222, optimization (OPT) 224, and back end processing (BE) 226.

The FE stage 218 typically converts the source program 212 to a (possibly) different internal form (IF) that may be conveyed to the ILG stage 222. As part of the preparation of the internal form, the FE stage 218 typically parses and performs semantic analysis on the source program 212. The front end processing may save information in, and possibly retrieve information from, the symbol information data structure(s) 220. These symbol information data structures, if they are used, may either be separate from or adjoined to the intermediate form. In addition, the FE stage 218 may perform optimization techniques such as program slicing techniques on the source program 212. Program slicing can be used to eliminate from the source program 212 those statements whose execution does not affect the observable behavior of the program. A more detailed description of program slicing may be found in F. Tip, "A Survey of Program Slicing Techniques", Journal of Programming Languages 3, 3 (1995), pp. 121–189, hereinafter incorporated by reference in its entirety.

The ILG stage 222 produces intermediate language instructions (IL) from the internal form of the program, possibly consulting the symbol table 220. The intermediate language form of the program may be conveyed to the BE stage 226 either directly or by way of the optimization stage 224. If the intermediate language (IL) form of the program is conveyed to the optimization stage 224, then the optimization stage 224 produces a functionally equivalent and preferably faster or smaller version of the program, typically again in the intermediate form. This version of the program may then be conveyed to the BE stage 226. To this end, the optimization stage 224 may be in communication with the symbol table 220. Once an intermediate language form of the program is received by the BE stage 226, either directly or after optimization, the BE stage 226 generates executable code that is functionally equivalent to the intermediate language form of the program. In addition, for object oriented programming languages, the BE stage 226 implements an object model and generates code that implements the object oriented features used by the source program 212. In addition, the BE stage 226 may optimize the generated code. The executable code generated by the BE stage 226 is a run-time representation of the source program. and is typically compatible with a specific computer architecture, for example the Windows®-Intel® architecture or a virtual machine architecture such as the architecture specified for the JAVA™ virtual machine. The constitutions and functions of these elements are well known in the art and will not be otherwise described here. For example, further description on the various intermediate language generators and other functionality of the compiler may be found in A. V. Aho et al., "Compilers Principles, Techniques and Tools, Addison-Wesley, 1986.

The class hierarchy specialization mechanism of the present invention may be integrated into the front end processing stage 218 of the compilation process 210 presented above thereby eliminating instances of objects and inheritance relations that are not necessary for the execution of the program P. The class hierarchy specialization mechanism of the present invention is preferably performed subsequent to an operation that removes from the program code whose execution does not affect the observable execution behavior of the program. An example of such an operation is a program slicing operation. Program slicing can be used to eliminate from the source program 212 those statements whose execution does not affect the observable behavior of the program. A more detailed description of program slicing may be found in F. Tip, "A Survey of Program Slicing Techniques", Journal of Programming Languages 3, 3 (1995), pp. 121–189, incorporated by reference above in its entirety.

In an alternate embodiment, the class hierarchy specialization technique of the present invention may be performed on a source program, thereby generating an optimized source program. In this case, the optimized source would be supplied as input 212 to the compilation process 210.

The class hierarchy specialization mechanism of the present invention may also be integrated into a software application for program understanding and debugging.

Preferably, the class hierarchy specialization mechanism of the present invention is utilized in conjunction with an operation that removes from the program any code whose execution does not affect the observable execution behavior of the program. An example of such an operation is a program slicing operation, details of which is described earlier. Class specialization extends the applicability of program slicing to object-oriented languages by indicating which instances of objects of a class hierarchy are used/not used in obtaining a value computed at some point of interest in a program. Class Hierarchy specialization may also be used in tools for understanding and modification of the design of class hierarchies.

The class specialization mechanism of the present invention is preferably applied to programs having the following characteristics:

the program contains only default constructors and destructors, the program contains no abstract base classes or pure virtual functions, the program contains no multi-level pointers, or pointers-to-members, the program contains no explicit type casts, the program contains no typedefs and templates, data members are of a built-in type, the program contains no distinct variables, parameters, members or classes with the same name (virtual functions with the same name are considered), if the program contains an (implicit) type cast from a class Z to a replicated class X, then X is an immediate base class of Z, if the program contains a member access v.m or v→m that statically resolves to a member m in a replicated class X, then the type of v is X.

the program contains no pointer arithmetic, no methods are called using the :: operator, the program contains no exeception handling constructs.

However, the present invention is not limited in this respect and may be applied with additional steps to source programs that do not have such characteristics and/or have additional characteristics.

The mechanism of the present invention is capable of eliminating virtual inheritance. This will be illustrated by the examplary program of FIG. 23, which exhibits virtual inheritance. FIG. 24 shows the basic information gathered for this program in step 701. FIG. 25 shows the type constraints computed in step 703. FIG. 26 shows the class hierarchy constructed in step 705 of the algorithm. FIG. 27 shows the class hierarchy resulting from the application of the simplification rules of FIG. 20 to the hierarchy of FIG. 26, and FIG. 28 shows the updated main program. Observe that the specialized class hierarchy no longer contains virtual inheritance, which reduces the amount of time required to access member located in virtual base classes, and which reduces the amount of space required to represent objects a and b as well.

In the IBM x1C compiler running on an RS/6000 workstation with AIX 4.1, the size of the objects are as follows:

|  | original | specialized | simplified |
|---|---|---|---|
| object a | 24 bytes | 64 bytes | 12 bytes |
| object b | 44 bytes | 80 bytes | 20 bytes |

Observe that the intermediate result (the class hierarchy of FIG. 26) requires more space to represent the objects due to the heavy use of virtual inheritance. However, the final result (the class hierarchy of FIG. 27) requires less than 50% of the space that was originally required. Thus, the mechanism of the present invention reduces the storage space required to store the run-time representation of the program.

While the invention has been described above with respect to particular embodiments thereof, those skilled in the art will recognize that the invention can be practiced with modification within the spirit and scope of the appended claims.

We claim:

1. A program storage device, readable by a machine, tangibly embodying instructions to perform method steps for generating a representation of a program P, wherein said program P has a class hierarchy H and uses a collection of variables V, said method steps comprising:

identifying said class hierarchy H and said set of variables V of said program P;

applying a set of transformation rules to said class hierarchy H to generate a new class hierarchy H', wherein said set of transformation rules performs one of the following operations:
  i) merging of two classes;
  ii) removing a virtual inheritance relation;
  iii) replacing a virtual inheritance relation with a non-virtual inheritance relation; and generating of representation of said program P based upon said new class hierarchy H'.

2. The program storage device of claim 1, wherein observable execution behavior of said program P is not affected by said step of applying said set of transformation rules.

3. The program storage device of claim 1, wherein said operation dictated by said set of transformation rules is performed only if objects within said program P will become smaller in size in relation to the size of corresponding objects within said program P if said operation is not performed.

4. The program storage device of claim 1, wherein said class hierarchy H of said program P is a specialized class hierarchy that is based upon a set of type constraints associated with elements of said program P that must be retained in order to preserve execution behavior of said program P.

5. The program storage device of claim 1, wherein said class hierarchy H of said program P is a class hierarchy obtained by class hierarchy slicing.

6. The program storage device of claim 1, wherein the step of applying a set of transformation rules to said class hierarchy H is performed subsequent to operations that remove dead code from said program P.

* * * * *